US012640395B2

(12) United States Patent
Takahashi et al.

(10) Patent No.: US 12,640,395 B2

(45) Date of Patent: May 26, 2026

(54) METHOD FOR PRODUCING LITHIUM DIFLUOROPHOSPHATE, METHOD FOR PRODUCING DIFLUOROPHOSPHATE ESTER, LITHIUM DIFLUOROPHOSPHATE, METHOD FOR PRODUCING NONAQUEOUS ELECTROLYTIC SOLUTION, AND METHOD FOR PRODUCING NONAQUEOUS SECONDARY BATTERY

(71) Applicant: CENTRAL GLASS CO., LTD., Ube (JP)

(72) Inventors: Mikihiro Takahashi, Yamaguchi (JP); Masutaka Shinmen, Yamaguchi (JP); Takayoshi Morinaka, Yamaguchi (JP); Masataka Fujimoto, Yamaguchi (JP); Susumu Iwasaki, Yamaguchi (JP); Keita Nakahara, Yamaguchi (JP); Masahiro Miura, Yamaguchi (JP); Shunsuke Mimura, Yamaguchi (JP); Katsuya Kubo, Yamaguchi (JP)

(73) Assignee: CENTRAL GLASS CO., LTD., Ube (JP)

( * ) Notice: Subject to any disclaimer, the term of this patent is extended or adjusted under 35 U.S.C. 154(b) by 1121 days.

(21) Appl. No.: 17/632,477

(22) PCT Filed: Aug. 6, 2020

(86) PCT No.: PCT/JP2020/030161

§ 371 (c)(1),
(2) Date: Feb. 2, 2022

(87) PCT Pub. No.: WO2021/025107

PCT Pub. Date: Feb. 11, 2021

(65) Prior Publication Data

US 2022/0384847 A1 Dec. 1, 2022

(30) Foreign Application Priority Data

Aug. 6, 2019 (JP) ................................ 2019-144873
Aug. 6, 2019 (JP) ................................ 2019-144874

(51) Int. Cl.
*H01M 10/0567* (2010.01)
*C01B 25/455* (2006.01)
*C07F 9/146* (2006.01)

(52) U.S. Cl.
CPC ....... *H01M 10/0567* (2013.01); *C01B 25/455* (2013.01); *C07F 9/146* (2013.01);
(Continued)

(58) Field of Classification Search
None
See application file for complete search history.

(56) References Cited

U.S. PATENT DOCUMENTS 6,413,678 B1 7/2002 Hamamoto et al.
2002/0168576 A1 11/2002 Hamamoto et al.
(Continued)

FOREIGN PATENT DOCUMENTS

CN 102036912 4/2011
CN 107285293 10/2017
(Continued)

OTHER PUBLICATIONS

CN 110021785 A machine translation (Year: 2019).*
(Continued)

*Primary Examiner* — Michael Forrest
*Assistant Examiner* — Nicole Lee Quist
(74) *Attorney, Agent, or Firm* — HSML P.C.

(57) ABSTRACT

There is provided a method for producing lithium difluorophosphate in which difluorophosphate ester reacts with a lithium salt compound in a nonaqueous organic solvent
(Continued)

without using water as a raw material, a method for producing a difluoro phosphate ester including a step of allowing a dihalophosphate ester to react with a fluorinating agent having a concentration of contained hydrogen fluoride of 15 mol % or less in a nonaqueous organic solvent; lithium difluorophosphate in which a value of a relational expression (d90−d10)/MV represented by d90 which is a particle size at which a volume cumulative distribution is 90%, d10 which is a particle size at which a volume cumulative distribution is 10%, and MV which is a volume average particle size is 10 or less; and methods for producing a nonaqueous electrolytic solution and a nonaqueous secondary battery using the production method described above.

12 Claims, 2 Drawing Sheets

(52) U.S. Cl.
CPC ...... *C01P 2004/03* (2013.01); *C01P 2004/51* (2013.01); *C01P 2006/40* (2013.01); *H01M 2300/0025* (2013.01)

(56) References Cited

U.S. PATENT DOCUMENTS

| | | | |
|---|---|---|---|
| 2010/0323240 A1 | 12/2010 | Tsujioka et al. |
| 2011/0111288 A1 | 5/2011 | Nishida et al. |
| 2011/0223089 A1 | 9/2011 | Nishida et al. |
| 2011/0223488 A1 | 9/2011 | Nishida et al. |

FOREIGN PATENT DOCUMENTS

| | | | | | |
|---|---|---|---|---|---|
| CN | 108147385 | | | 6/2018 | |
| CN | 110021785 | A | * | 7/2019 | ........ H01M 10/0525 |
| EP | 3831771 | | | 6/2021 | |
| JP | 3438636 | B2 | | 8/2003 | |
| JP | 3439085 | B2 | | 8/2003 | |
| JP | 2010-155773 | | | 7/2010 | |
| JP | 4604505 | B2 | | 1/2011 | |
| JP | 5277550 | B2 | | 8/2013 | |
| JP | 2015-225749 | | | 12/2015 | |
| JP | 5893522 | B2 | | 3/2016 | |
| JP | 2016201177 | A | * | 12/2016 | |
| JP | 2018-090439 | | | 6/2018 | |
| JP | 6443903 | B1 | | 12/2018 | |
| JP | 2019-001700 | | | 1/2019 | |
| KR | 2018-0135406 | | | 12/2018 | |
| KR | 101925051 | B1 | * | 2/2019 | ........ H01M 10/0568 |
| WO | 2015/122511 | | | 8/2015 | |

OTHER PUBLICATIONS

JP 2016201177 machine translation (Year: 2016).*
KR 101925051 machine translation (Year: 2019).*
Chinese Office Action issued in CN Patent Application No. 202080055861.3, issued May 29, 2024, 9 pages, English machine translation provided.
International Search Report and Written Opinion of PCT/JP2020/030161, Oct. 13, 2020, 8 pages including English translation of the International Search Report.
Mahesha B. Herath et al., "Perfluoroalkyl Phosphonic and Phosphinic Acids as Proton Conductors for Anhydrous Proton-Exchange Membranes," ChemPhysChem., 2010, 11,(13), pp. 2871-2878.
The extended European search report issued for European Patent Application No. 20850424.1, dated Aug. 23, 2023, 7 pages.
Office Action issued for Chinese Patent Application No. 202080055861.3, Jan. 27, 2024, 11 pages including machine translation.
Potassium Fluoride product data sheet, FujiFilm, 16 pages, partial English translation, discussed in remarks of JP Office Action.
Sodium Fluoride product data sheet, FujiFilm, 14 pages, partial English translation, discussed in remarks of JP Office Action.
Japanese Office Action issued in JP2021-537374, issued Jan. 21, 2025, 5 pages, English machine translation.
Japanese Office Action issued in JP 2021-537374, dated Aug. 13, 2024, 5 pages including translation, English machine translation.

* cited by examiner

METHOD FOR PRODUCING LITHIUM DIFLUOROPHOSPHATE, METHOD FOR PRODUCING DIFLUOROPHOSPHATE ESTER, LITHIUM DIFLUOROPHOSPHATE, METHOD FOR PRODUCING NONAQUEOUS ELECTROLYTIC SOLUTION, AND METHOD FOR PRODUCING NONAQUEOUS SECONDARY BATTERY

TECHNICAL FIELD

The present disclosure relates to a method for producing lithium difluorophosphate, a method for producing a difluorophosphate ester, lithium difluorophosphate, a method for producing a nonaqueous electrolytic solution, and a method for producing a nonaqueous secondary battery.

BACKGROUND ART

In a battery which is an electrochemical device, in recent years, attention has been paid to a power storage system for small and high energy density applications, such as information related equipment and communication equipment, that is, a personal computer, a video camera, a digital camera, a mobile phone, a smartphone, and an electric tool, and a power storage system for large and power applications, such as an electric vehicle, a hybrid vehicle, an auxiliary power supply for a fuel cell vehicle, and power storage. One of the candidates is a nonaqueous electrolytic solution battery such as a lithium ion battery, a lithium battery, or a lithium ion capacitor.

Although many of these nonaqueous electrolytic solution batteries have already been put into practical use, these nonaqueous electrolytic solution batteries are not satisfactory in various applications in terms of durability, and still pose a major problem for use in automotive applications due to significant degradation thereof at a high temperature of 45° C. or higher.

As means for improving durability such as cycle characteristics and high-temperature storability of the nonaqueous electrolytic solution battery, optimization of various battery components including active materials for positive and negative electrodes has been studied. Technologies related to nonaqueous electrolytic solutions are no exception, and it has been proposed to prevent deterioration due to decomposition of an electrolytic solution on a surface of an active positive electrode or a negative electrode with various additives. For example, Patent Literature 1 proposes to improve battery characteristics by adding vinylene carbonate to an electrolytic solution. The method prevents decomposition on the surface of the electrolytic solution by coating an electrode with a polymer film formed by polymerization of vinylene carbonate, but the problem is that the internal resistance is increased because lithium ions also have difficulty passing through the film, There has been known that the addition of lithium difluorophosphate disclosed in Patent Literature 2 is effective in reducing the internal resistance.

For lithium difluorophosphate used as an additive, many synthesis methods have been developed and reported (for example, Patent Literatures 3 to 7).

As a method for producing the lithium difluorophosphate, for example, a method of obtaining lithium difluorophosphate by allowing a difluorophosphate ester and water to react with a lithium salt (for example, lithium chloride) as in step (2) in Patent Literature 7 is disclosed. In this method, the difluorophosphate ester is rapidly hydrolyzed with water, and difluorophosphoric acid produced here further reacts with lithium chloride, whereby lithium difluorophosphate is obtained.

It is disclosed that the difluorophosphate ester as a raw material of the production method described above is obtained, for example, by allowing a dihalophosphate ester compound to act on a fluorinating agent in a nonaqueous solvent under the action of a catalyst, as in step (1) in Patent Literature 7.

As a method of obtaining a difluorophosphate ester without using a catalyst, as described in Non-Patent Literature 1, a method of allowing a dichlorophosphate ester (here, ethyl ester) to react with potassium fluoride in acetonitrile is exemplified.

CITATION LIST

Patent Literature

Patent Literature 1: Japanese Patent No. 3438636
Patent Literature 2: Japanese Patent No. 3439085
Patent Literature 3: Japanese Patent No. 4604505
Patent Literature 4: Japanese Patent No. 5277550
Patent Literature 5: Japanese Patent No. 5893522
Patent Literature 6: WO2015/122511
Patent Literature 7: Japanese Patent No. 6443903

NON-PATENT LITERATURE

Non-Patent Literature 1: Chem Phys Chem 2010, 11, 2871-2878.

SUMMARY OF INVENTION

Technical Problem

Patent Literature 3 describes that lithium difluorophosphate can be produced by allowing lithium hexafluorophosphate (hereinafter referred to as $LiPF_6$) to react with silicon dioxide, but it takes a very long time of 3 days to complete the reaction at a reaction temperature of 50° C. A method of increasing a reaction temperature in order to improve a reaction rate may be considered, but when the reaction temperature exceeds 60° C., the decomposition of $LiPF_6$ starts to occur, which may lead to an increase in impurities.

Patent Literature 4 discloses a method in which lithium difluorophosphate can be produced with a high selectivity in a short time by allowing a halide other than fluoride and $LiPF_6$ to react with water in a nonaqueous solvent. However, as with the method using silicon dioxide described above, four of six fluorine atoms in a raw material $LiPF_6$ are removed, which adds to a waste disposal cost and is not an efficient mass production method from the viewpoint of effective use of limited fluorine resources.

As a method for improving the utilization efficiency of the fluorine, Patent Literature 5 discloses a method for obtaining lithium difluorophosphate by allowing lithium dichlorophosphate synthesized from lithium carbonate and phosphorus oxychloride to react with hydrogen fluoride, and Patent Literature 6 discloses a method for obtaining lithium difluorophosphate by allowing lithium dichlorophosphate synthesized from phosphorus oxychloride and lithium hydroxide to react with triethylamine hydrofluoride (molar ratio of triethylamine to hydrofluoric acid is 1:2.04), but these methods promote a side reaction in which a fluorine anion reacts with a lithium cation to produce lithium fluoride. For this reason, in order to obtain high-purity lithium difluorophosphate, there is a large problem that it is necessary to perform removal by filtration of fine lithium fluoride, which requires very much labor.

As a method of improving the utilization efficiency of fluorine as compared with Patent Literatures 3 and 4 using $LiPF_6$ as a raw material and not accompanied by a by-product of lithium fluoride as in Patent Literatures 5 and 6, Patent Literature 7 discloses a method of obtaining lithium difluorophosphate by allowing a difluorophosphate ester and water, to react with a lithium salt (e.g., lithium chloride). In this method, water is used as an essential raw material (in Examples, it is disclosed that water is used at a ratio of 0.8 mass % to 1.7 mass % with respect to a total amount of raw materials (difluorophosphate ester+lithium salt+water +non-aqueous solvent)), a difluorophosphate ester is rapidly hydrolyzed with water, and lithium difluorophosphate is obtained by further allowing difluorophosphoric acid generated here to react with lithium chloride.

However, when the amount of the raw material used for the reaction is small, the number of steps required for the preparation of the raw material is reduced and the efficiency is excellent, and therefore, a novel production method is required from this viewpoint.

In addition, although the difluorophosphate ester can be produced by the method disclosed in Non-Patent Literature 1 without using a special catalyst, the selectivity of fluorination (ratio of target substance in a group of fluorinated compounds obtained by fluorination, hereinafter referred to as "fluorination selectivity") may be decreased depending on the manufacturer or manufacturing lot of the fluorinating agent, and it has been strongly demanded to stably achieve a higher selectivity.

Further, the dissolution of a lithium difluorophosphate powder in a nonaqueous solvent is an exothermic reaction, but lithium hexafluorophosphate, which is a main electrolyte contained in a nonaqueous electrolytic solution of a lithium ion battery, starts to be decomposed at a temperature exceeding 60° C. Therefore, in order to prepare an electrolytic solution containing the additive by introducing any amount of lithium difluorophosphate into the nonaqueous electrolytic solution, it is necessary to pay careful attention to prevent an increase in an internal temperature.

The present disclosure has been made in view of the above circumstances, and an object of the present disclosure is to provide a novel method for producing lithium difluorophosphate, a method for producing a nonaqueous electrolytic solution, and a method for producing a nonaqueous secondary battery, in which the amount of raw materials used for the reaction is small and the efficiency is excellent.

Another object of the present disclosure is to provide a method for producing a difluorophosphate ester that can stably achieve a high fluorination selectivity and a high yield, a method for producing lithium difluorophosphate derived from the difluorophosphate ester, a method for producing a nonaqueous electrolytic solution using the lithium difluorophosphate, and a method for producing a nonaqueous secondary battery.

Another object of the present disclosure is to provide, as an additive, lithium difluorophosphate that generates less heat when dissolved in a nonaqueous electrolytic solution.

Solution to Problem

The present disclosure has solved the above problems by the following means.

<1>

A method for producing lithium difluorophosphate, including: allowing a difluorophosphate ester represented by the following general formula (1A) to react with a lithium salt compound in a nonaqueous organic solvent, in which water is not used as a raw material in the reaction.

(1A)

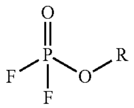

[In the general formula (1A), R represents a hydrocarbon group having 1 to 15 carbon atoms, and any hydrogen atom of the hydrocarbon group may be substituted with a halogen atom]

<2>

The method for producing lithium difluorophosphate according to <1>, in which an amount of water contained in a total amount of the difluorophosphate ester represented by the general formula (1A), the lithium salt compound, and the nonaqueous organic solvent before the reaction is 200 ppm by mass or less.

<3>

The method for producing lithium difluorophosphate according to <1> or <2>, in which the amount of water contained in the total amount of the difluorophosphate ester represented by the general formula (1A), the lithium salt compound, and the nonaqueous organic solvent before the reaction is 145 ppm by mass or less.

<4>

The method for producing lithium difluorophosphate according to any one of <1> to <3>, in which the amount of water contained in the total amount of the difluorophosphate ester represented by the general formula (1A), the lithium salt compound, and the nonaqueous organic solvent before the reaction is 135 ppm by mass or less.

<5>

The method for producing lithium difluorophosphate according to any one of <1> to <4>, in which the lithium salt compound is at least one selected from the group consisting of lithium chloride, lithium bromide, lithium fluoride, lithium carbonate, lithium acetate, and lithium propionate.

<6>

The method for producing lithium difluorophosphate according to any one of <1> to <5>, in which the nonaqueous organic solvent is at least one selected from the group consisting of a carbonate ester, a chain ester, an ether, and a ketone.

<7>

The method for producing lithium difluorophosphate according to <6>, in which the carbonate ester is at least one selected from the group consisting of ethyl methyl carbonate, dimethyl carbonate, diethyl carbonate, methyl propyl carbonate, ethyl propyl carbonate, propylene carbonate, and butylene carbonate, the chain ester is at least one selected from the group consisting of ethyl acetate, methyl acetate, propyl acetate, methyl propionate, ethyl propionate, and propyl propionate, the ether is at least one selected from the group consisting of dimethoxyethane, dimethoxymethane, tetrahydrofuran, and diethyl ether, and the ketone is at least one selected from the group consisting of acetone, ethyl methyl ketone, and diethyl ketone.

<8>

The method for producing lithium difluorophosphate according to any one of <1> to <7>, in which the reaction is performed under protection of an inert gas.

<9>

A method for producing a nonaqueous electrolytic solution using lithium difluorophosphate obtained by the production method according to any one of <1> to <8>.

<10>

A method for producing a nonaqueous secondary battery using a nonaqueous electrolytic solution obtained by the production method according to <9>.

<11>

A method for producing a difluorophosphate ester represented by the following general formula (2), including: a step 1 of allowing a dihalophosphate ester represented by the following general formula (1) to react with a fluorinating agent having a concentration of contained hydrogen fluoride of 15 mold or less in a nonaqueous organic solvent (a).

(1)

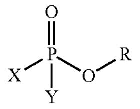

(2)

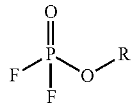

[In the general formula (1), wherein X represents a fluorine atom, a chlorine atom, a bromine atom, or an iodine atom, Y represents a chlorine atom, a bromine atom, or an iodine atom. In the general formulae (1) and (2), R represents a hydrocarbon group having 1 to 15 carbon atoms, and any hydrogen atom of the hydrocarbon group may be substituted with a halogen atom.]

<12>

The method for producing a difluorophosphate ester according to <11>, in which the nonaqueous organic solvent (a) is at least one selected from the group consisting of a carbonate ester, a chain ester, and a ketone.

<13>

The method for producing a difluorophosphate ester according to <12>, in which the nonaqueous organic solvent (a) is at least one selected from the group consisting of a carbonate ester and a chain ester, and the carbonate ester is at least one selected from the group consisting of ethylmethyl carbonate, dimethyl carbonate, diethyl carbonate, methylpropyl carbonate, ethylpropyl carbonate, propylene carbonate, and butylene carbonate, and the chain ester is at least one selected from the group consisting of methyl acetate, ethyl acetate, propyl acetate, methyl propionate, ethyl propionate, and propyl propionate.

<14>

The method for producing a difluorophosphate ester according to any one of <11> to <13>, in which the fluorinating agent is at least one selected from a hydrofluoride of organic amine and inorganic fluoride.

<15>

The method for producing a difluorophosphate ester according to <14>, in which the hydrofluoride of organic amine is at least one selected from the group consisting of a triethylamine monohydrofluoride, a tetramethylethylenediamine dihydrofluoride, and a pyridine monohydrofluoride, and the inorganic fluoride is at least one selected from the group consisting of ammonium fluoride, sodium fluoride, potassium fluoride, cesium fluoride, and zinc fluoride.

<16>

The method for producing a difluorophosphate ester according to <11>, in which the fluorinating agent is at least one selected from sodium fluoride, ammonium fluoride, a triethylamine monohydrofluoride, and a tetramethylethylenediamine dihydrofluoride, and the nonaqueous organic solvent (a) is at least one selected from an ester having a relative dielectric constant of 8 or less at 25° C., an ether having a relative dielectric constant of 8 or less at 25° C., and propylene carbonate.

<17>

The method for producing a difluorophosphate ester according to any one of <11> to <16>, in which no catalyst is used in the reaction in the step 1.

<18>

The method for producing a difluorophosphate ester according to <11>, in which the fluorinating agent is at least one selected from sodium fluoride, ammonium fluoride, cesium fluoride, zinc fluoride, a triethylamine monohydrofluoride, and a tetramethylethylenediamine dihydrofluoride, and the nonaqueous organic solvent (a) is at least one selected from the group consisting of an ester having a relative dielectric constant of 8 or less at 25° C. and an ether having a relative dielectric constant of 8 or less at 25° C.

<19>

The method for producing a difluorophosphate ester according to <18>, in which the ester having a relative dielectric constant of 8 or less at 25° C. is at least one selected from ethyl methyl carbonate, dimethyl carbonate, diethyl carbonate, methyl propyl carbonate, ethyl propyl carbonate, ethyl formate, propyl formate, methyl acetate, ethyl acetate, propyl acetate, butyl acetate, isobutyl acetate, pentyl acetate, methyl propionate, ethyl propionate, propyl propionate, and dibutyl phthalate.

<20>

The method for producing a difluorophosphate ester according to <18>, in which the ether having a relative dielectric constant of 8 or less at 25° C. is at least one selected from 1,2-dimethoxyethane, tetrahydrofuran, diethyl ether, and diethylene glycol diethyl ether.

<21>

A method for producing lithium difluorophosphate, including: a step 2 of allowing a difluorophosphate ester represented by the general formula (2) produced by the method for producing a difluorophosphate ester according to any one of <11> to <20> and a lithium salt compound (b) to react with water in a nonaqueous organic solvent (b).

<22>

The method for producing lithium difluorophosphate according to <21>, in which the nonaqueous organic solvent (b) is at least one selected from the group consisting of an ester, n-hexane, cyclohexane, n-heptane, isoheptane, benzene, toluene, xylene, acetonitrile, dimethyl ether, diethyl ether, ethylene glycol dimethyl ether, ethylene glycol diethyl ether, propylene glycol dimethyl ether, diethylene glycol dimethyl ether, anisole, phenetole, and tetrahydrofuran.

<23>

The method for producing lithium difluorophosphate according to <21> or <22>, in which the lithium salt compound (b) is at least one selected from the group consisting of lithium chloride, lithium bromide, lithium fluoride, lithium iodide, lithium hydroxide, lithium carbonate, lithium bicarbonate, lithium phosphate, lithium dihydrogen phosphate, dilithium hydrogen phosphate, lithium metaphosphate, lithium acetate, and lithium sulfate.

<24>

The method for producing lithium difluorophosphate according to any one of <21> to <23>, in which a molar ratio of the difluorophosphate ester represented by the general formula (2), the lithium salt compound (b), and water in the step 2 is 1:2:2 to 1:1:0.01.

<25>

A method for producing lithium difluorophosphate, including: a step 3 of allowing a difluorophosphate ester represented by the general formula (2) produced by the method for producing a difluorophosphate ester according to any one of <11> to <20> to react with a lithium salt compound (c) in a nonaqueous organic solvent (c), in which an amount of water contained in a total amount of the difluorophosphate ester represented by the general formula (2), the lithium salt compound (c), and the nonaqueous organic solvent (c) before the reaction in the step 3 is 200 ppm by mass or less.

<26>

The method for producing lithium difluorophosphate according to <25>, in which the amount of water contained in the total amount of the difluorophosphate ester represented by the general formula (2), the lithium salt compound (c), and the nonaqueous organic solvent (c) before the reaction in the step 3 is 145 ppm by mass or less.

<27>

The method for producing lithium difluorophosphate according to <25> or <26>, in which the lithium salt compound (c) is at least one selected from the group consisting of lithium chloride, lithium bromide, lithium fluoride, lithium carbonate, lithium acetate, and lithium propionate.

<28>

The method for producing lithium difluorophosphate according to any one of <25> to <27>, in which the nonaqueous organic solvent (c) is at least one selected from the group consisting of an ester, an ether, and a ketone.

<29>

The method for producing lithium difluorophosphate according to <28>, in which the nonaqueous organic solvent (c) contains an ester, and the ester is at least one selected from the group consisting of a cyclic carbonate ester, a chain carbonate ester, a chain ester, and a cyclic ester.

<30>

A method for producing lithium difluorophosphate, including: a step 4 of chlorinating a difluorophosphate ester represented by the general formula (2) produced by the method for producing a difluorophosphate ester according to any one of <11> to <20> with a chlorinating agent to convert the difluorophosphate ester into monochloro difluoro phosphine oxide, synthesizing difluorophosphoric acid by hydrolysis, and further performing neutralization.

<31>

The method for producing lithium difluorophosphate according to <30>, in which the chlorinating agent is phosphorus oxychloride.

<32>

The method for producing lithium difluorophosphate according to <30> or <31>, in which the neutralization is neutralization of difluorophosphoric acid by addition of lithium hydride or lithium chloride.

<33>

The method for producing lithium difluorophosphate according to any one of <21> to <32>, in which at least one of the steps 2 to 4 is performed under protection of an inert gas.

<34>

A method for producing a nonaqueous electrolytic solution using lithium difluorophosphate obtained by the method for producing lithium difluorophosphate according to any one of <21> to <33>.

<35>

A method for producing a nonaqueous secondary battery using a nonaqueous electrolytic solution obtained by the method for producing a nonaqueous electrolytic solution according to <34>.

<36>

The method for producing a lithium difluorophosphate according to any one of <1> to <8>, in which the difluorophosphate ester represented by the general formula (1A) is produced by a method for producing a difluorophosphate ester including a step 1 of allowing a dihalophosphate ester represented by the following general formula (1) to react with a fluorinating agent having a concentration of contained hydrogen fluoride of 15 mol % or less in a nonaqueous organic solvent (a).

(1)

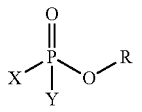

[In the general formula (1), X represents a fluorine atom, a chlorine atom, a bromine atom, or an iodine atom, and Y represents a chlorine atom, a bromine atom, or an iodine atom. In the general formula (1), R represents a hydrocarbon group having 1 to 15 carbon atoms, and any hydrogen atom of the hydrocarbon group may be substituted with a halogen atom.]

<37>

The method for producing a lithium difluorophosphate according to <36>, in which the nonaqueous organic solvent (a) is at least one selected from the group consisting of a carbonate ester, a chain ester, and a ketone.

<38>

The method for producing a lithium difluorophosphate according to <37>, in which the nonaqueous organic solvent (a) is at least one selected from the group consisting of a carbonate ester and a chain ester, and the carbonate ester is at least one selected from the group consisting of ethylmethyl carbonate, dimethyl carbonate, diethyl carbonate, methylpropyl carbonate, ethylpropyl carbonate, propylene carbonate, and butylene carbonate, and the chain ester is at least one selected from the group consisting of methyl acetate, ethyl acetate, propyl acetate, methyl propionate, ethyl propionate, and propyl propionate.

<39>

The method for producing lithium difluorophosphate according to any one of <36> to <38>, in which the fluorinating agent is at least one selected from a hydrofluoride of organic amine and inorganic fluoride.

<40>

The method for producing lithium difluorophosphate according to <39>, in which the hydrofluoride of organic amine is at least one selected from the group consisting of a triethylamine monohydrofluoride, a tetramethylethylenediamine dihydrofluoride, and a pyridine monohydrofluoride, and the inorganic fluoride is at least one selected from the group consisting of ammonium fluoride, sodium fluoride, potassium fluoride, cesium fluoride, and zinc fluoride.

<41>

The method for producing lithium difluorophosphate according to <36>, in which the fluorinating agent is at least one selected from sodium fluoride, ammonium fluoride, a triethylamine monohydrofluoride, and a tetramethylethylenediamine dihydrofluoride, and the nonaqueous organic solvent (a) is at least one selected from an ester having a relative dielectric constant of 8 or less at 25° C., an ether having a relative dielectric constant of 8 or less at 25° C., and propylene carbonate.

<42>

The method for producing lithium difluorophosphate according to any one of <36> to <41>, in which no catalyst is used in the reaction in the step 1.

<43>

The method for producing lithium difluorophosphate according to <36>, in which the fluorinating agent is at least one selected from sodium fluoride, ammonium fluoride, cesium fluoride, zinc fluoride, a triethylamine monohydrofluoride, and a tetramethylethylenediamine dihydrofluoride, and the nonaqueous organic solvent (a) is at least one selected from the group consisting of an ester having a relative dielectric constant of 8 or less at 25° C. and an ether having a relative dielectric constant of 8 or less at 25° C.

<44>

The method for producing lithium difluorophosphate according to <43>, in which the ester having a relative dielectric constant of 8 or less at 25° C. is at least one selected from ethyl methyl carbonate, dimethyl carbonate, diethyl carbonate, methyl propyl carbonate, ethyl propyl carbonate, ethyl formate, propyl formate, methyl acetate, ethyl acetate, propyl acetate, butyl acetate, isobutyl acetate, pentyl acetate, methyl propionate, ethyl propionate, propyl propionate, and dibutyl phthalate.

<45>

The method for producing lithium difluorophosphate according to <43>, in which the ether having a relative dielectric constant of 8 or less at 25° C. is at least one selected from 1,2-dimethoxyethane, tetrahydrofuran, diethyl ether, and diethylene glycol diethyl ether.

<46>

A method for producing a nonaqueous electrolytic solution using lithium difluorophosphate obtained by the production method according to any one of <36> to <45>.

<47>

A method for producing a nonaqueous secondary battery using a nonaqueous electrolytic solution obtained by the production method according to <46>.

<48>

A lithium difluorophosphate, in which a value of a relational expression (d90-d10)/MV represented by d90 which is a particle size at which a volume cumulative distribution is 90%, d10 which is a particle size at which a volume cumulative distribution is 10%, and MV which is a volume average particle size is 10 or less.

<49>

The lithium difluorophosphate according to <48>, in which a concentration of mixed hydrogen fluoride is 4000 ppm by mass or less.

Advantageous Effects of Invention

According to the present disclosure, it is possible to provide a novel method for producing lithium difluorophosphate, a method for producing a nonaqueous electrolytic solution, and a method for producing a nonaqueous secondary battery, in which the amount of raw materials used for the reaction is small and the efficiency is excellent.

In addition, according to the present disclosure, it is possible to provide a method for producing a difluorophosphate ester that can stably achieve a high fluorination selectivity and a high yield, a method for producing lithium difluorophosphate derived from the difluorophosphate ester, a method for producing a nonaqueous electrolytic solution using the lithium difluorophosphate, and a method for producing a nonaqueous secondary battery.

Further, according to the present disclosure, it is possible to provide, as an additive, lithium difluorophosphate that generates less heat when dissolved in a nonaqueous electrolytic solution.

DESCRIPTION OF EMBODIMENTS

Figure 1:
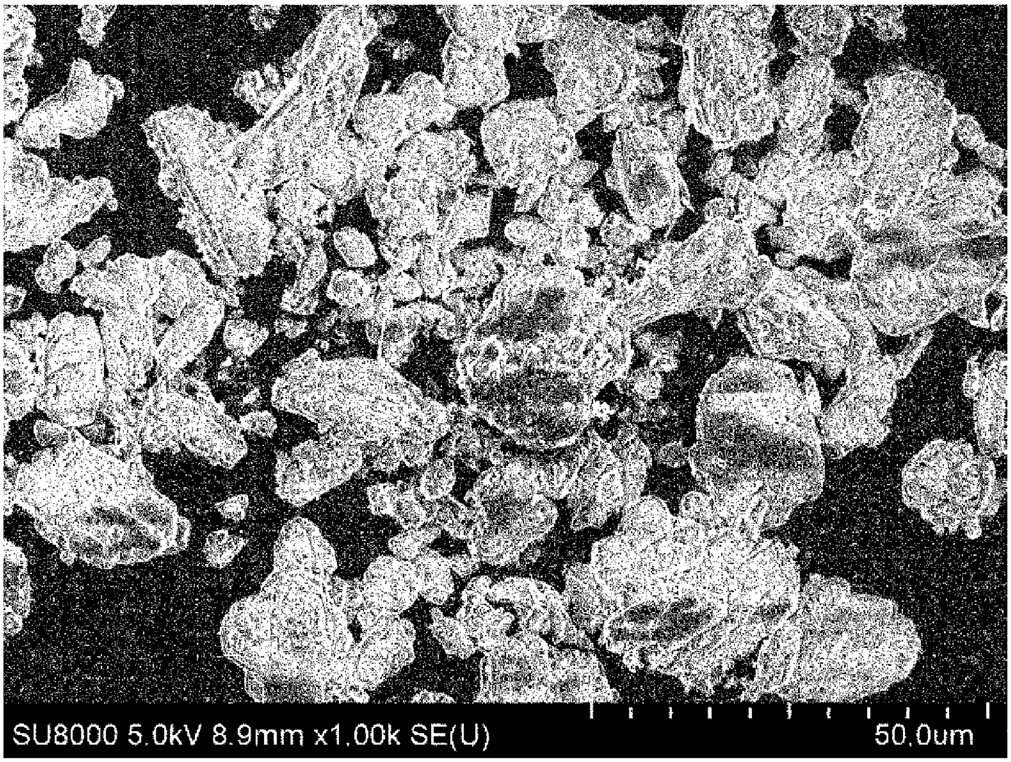
FIG. 1 is an SEM (Scanning Electron Microscope) image of lithium difluorophosphate in Example A.

Hereinafter, the present disclosure will be described in detail, but the description of the constituent elements described below is an example of an embodiment of the present disclosure, and the present disclosure is not limited to the specific contents thereof. Various modifications can be made within the scope of the gist of the invention.

In the present specification, the expression "to" is used to include the numerical values described therebefore and thereafter as the lower limit value and the upper limit value.

[Method for Producing Lithium Difluorophosphate]

The present disclosure provides a method for producing lithium difluorophosphate by allowing a difluorophosphate ester represented by the following general formula (1A) to react with a lithium salt compound in a nonaqueous organic solvent, in which water is not used as a raw material in the reaction.

(1A)

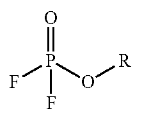

In general formula (1A), R represents a hydrocarbon group having 1 to 15 carbon atoms, and any hydrogen atom of the hydrocarbon group may be substituted with a halogen atom.

In the present disclosure, since water is not used as a raw material in the reaction, the amount of raw materials used in the reaction can be reduced as compared with the production method in Patent Literature 7 in which water is used as an essential raw material, the number of steps required for preparing the raw materials can be reduced, and the efficiency can be improved.

In the present disclosure, "water is not used as a raw material" means that water is not actively added as a raw material, and more specifically, an amount of water in the system before the reaction is 7000 ppm by mass or less with respect to the total amount of the raw materials.

<Amount of Water in Total Amount of Raw Materials Before Reaction>

In the method for producing lithium difluorophosphate of the present disclosure (hereinafter, also referred to as the production method of the present disclosure), the amount of water contained in the total amount of the raw materials before the reaction is more preferably 1000 ppm by mass or less, still more preferably 500 ppm by mass or less, and particularly preferably 200 ppm by mass or less. By setting the amount of water in the total amount of the raw materials before the reaction to 200 ppm by mass or less, side reactions shown in the following 1) to 3) can be prevented, and the target lithium difluorophosphate can be obtained with high purity.

1) Formation of lithium monofluorophosphate due to hydrolysis of lithium difluorophosphate as target product 2) Formation of a by-product of an alcohol (ROH) resulting from a reaction between a difluorophosphate ester represented by the general formula (1A) and water 3) Formation of a compound ($LiPO_2F(OR)$) and a by-product of hydrogen fluoride from a reaction between by-product alcohol (ROH) and lithium difluorophosphate.

R in ROH and $LiPO_2F(OR)$ is the same as R in the general formula (1A).

From the viewpoint of further reducing an amount of hydrogen fluoride to be mixed, the amount of water in the total amount of the raw materials before the reaction is preferably 145 ppm by mass or less, and more preferably 135 ppm by mass or less.

In the method described in Patent Literature 7, since water is used as an essential raw material, alcohol and hydrogen chloride are always produced as by-products. The present inventors have found that the alcohol is a problem, the alcohol is strongly added to the lithium difluorophosphate by hydrogen bonding even when the alcohol is tried to be removed by drying under heating and reduced pressure, it is extremely difficult to completely remove the alcohol itself, and a large problem that the lithium difluorophosphate reacts with the alcohol to generate hydrogen fluoride occurs. Further, the present inventors have found that the hydrolysis does not stop completely in one step and the hydrolysis of difluorophosphoric acid or lithium difluorophosphate partially progresses, causing a problem that monofluorophosphate and hydrogen fluoride are mixed.

According to the preferred aspect of the present disclosure, high-purity lithium difluorophosphate containing a small amount of hydrogen fluoride and impurities to be mixed can be produced with high efficiency.

Here, since a difluorophosphate ester rapidly reacts with water to be hydrolyzed, water cannot be present in the difluorophosphate ester before the reaction. Therefore, assuming that "the amount of water contained in the difluorophosphate ester before the reaction" is "0 ppm by mass", the amount of water in the total amount of the raw materials before the reaction is calculated.

In the present disclosure, the amount of water in the total amount of the raw materials before the reaction is calculated by measuring and summing the amount of water in each of the lithium salt compound and the nonaqueous organic solvent using a Karl Fischer Moisture Titrator. The amount of water in the lithium salt compound is a value obtained by connecting an Evaporator to the Karl Fischer Moisture Titrator and measuring the amount of water at a set temperature of 150° C.

As described above, by setting the amount of water in the total amount of the raw materials before the reaction to 7000 ppm by mass or less, more preferably 1000 ppm by mass or less, even more preferably 500 ppm by mass or less, and particularly preferably 200 ppm by mass or less, it is possible to produce high-purity lithium difluorophosphate having a small amount of hydrogen fluoride to be mixed therein, and therefore, a purification (mainly recrystallization) step which is usually required is not necessary, and it is possible to efficiently produce high-quality lithium difluorophosphate at low cost.

<Difluorophosphate Ester Represented by General Formula (1A)>

In the production method of the present disclosure, a difluorophosphate ester represented by the following general formula (1A) is used as a raw material.

(1A)

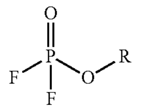

In general formula (1A), R represents a hydrocarbon group having 1 to 15 carbon atoms, and any hydrogen atom of the hydrocarbon group may be substituted with a halogen atom.

The hydrocarbon group having 1 to 15 carbon atoms and represented by R may be linear, branched, or cyclic, and may have a multiple bond. The hydrocarbon group may be either an aliphatic hydrocarbon group or an aromatic hydrocarbon group. Specific examples thereof include an alkyl group having 1 to 15 carbon atoms, an alkenyl group having 2 to 15 carbon atoms, an alkynyl group having 2 to 15 carbon atoms, a cycloalkyl group having 3 to 15 carbon atoms, an aryl group having 6 to 15 carbon atoms, and an aralkyl group having 7 to 15 carbon atoms, and an alkyl group having 1 to 15 carbon atoms or an aryl group having 6 to 15 carbon atoms is preferable.

Examples of the alkyl group having 1 to 15 carbon atoms include a methyl group, an ethyl group, a n-propyl group, an i-propyl group, a n-butyl group, a s-butyl group, a t-butyl group, a n-pentyl group, a n-hexyl group, and a n-dodecyl group, and an alkyl group having 1 to 10 carbon atoms is preferable, and a methyl group, an ethyl group, a n-propyl group, or an i-propyl group is preferable.

Examples of the aryl group having 6 to 15 carbon atoms include a phenyl group, a naphthyl group, and an anthryl group, and a phenyl group is preferable.

In addition, any hydrogen atom of the hydrocarbon group represented by R may be substituted with a halogen atom.

Examples of the halogen atom include a fluorine atom, a chlorine atom, a bromine atom and an iodine atom, and a fluorine atom is preferable.

R is preferably an unsubstituted alkyl group having 1 to 15 carbon atoms or an unsubstituted aryl group having 6 to 15 carbon atoms, and more preferably an unsubstituted alkyl group having 1 to 10 carbon atoms or an unsubstituted phenyl group.

As described above, the amount of water in the difluorophosphate ester represented by the general formula (1A) before the reaction is "0 ppm by mass".

A method for synthesizing the difluorophosphate ester represented by the general formula (1A) is not particularly limited, and various known synthesis methods can be used.

For example, the difluorophosphate ester can be obtained by allowing a dihalophosphate ester such as a dichlorophosphate ester to react with a known fluorinating agent (e.g., potassium fluoride, hydrogen fluoride, sodium hexafluorosilicate, sodium fluoride, ammonium fluoride, cesium fluoride, a triethylamine trifluoride salt, or a pyridine hydrofluoride).

The difluorophosphate ester represented by the general formula (1A) is preferably produced by a method for producing a difluorophosphate ester of the present disclosure described later. That is, the method for producing lithium difluorophosphate of the present disclosure is preferably a method for producing lithium difluorophosphate in which the difluorophosphate ester represented by the general formula (1A) is produced by a method for producing a difluorophosphate ester, the method including a step 1 of allowing a dihalophosphate ester represented by the following general formula (1) to react with a fluorinating agent having a concentration of contained hydrogen fluoride of 15 mol % or less in a nonaqueous organic solvent (a). The use of the difluorophosphate ester represented by the general formula (1A) produced by the method for producing a difluorophosphate ester of the present disclosure is preferable because of comprehensively excellent yield and purity.

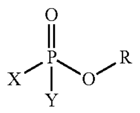

(1)

[In general formula (1), X represents a fluorine atom, a chlorine atom, a bromine atom, or an iodine atom, and Y represents a chlorine atom, a bromine atom, or an iodine atom. In general formula (1), R represents a hydrocarbon group having 1 to 15 carbon atoms, and any hydrogen atom of the hydrocarbon group may be substituted with a halogen atom.]

The specific description and the description of the preferred aspect of the method for producing a difluorophosphate ester including the step 1 are the same as those described later.

<Lithium Salt Compound>

The lithium salt compound used in the production method of the present disclosure is not particularly limited, and examples thereof include at least one selected from the group consisting of lithium chloride, lithium bromide, lithium fluoride, lithium carbonate, lithium acetate, lithium propionate, lithium iodide, lithium hydroxide, lithium bicarbonate, lithium phosphate, lithium dihydrogen phosphate, lithium hydrogen phosphate, lithium metaphosphate and lithium sulfate.

The lithium salt compound is preferably at least one selected from the group consisting of lithium chloride, lithium bromide, lithium fluoride, lithium carbonate, lithium acetate, and lithium propionate Among these, at least one selected from the group consisting of lithium chloride, lithium acetate, lithium carbonate, and lithium propionate is more preferable, and at least one selected from the group consisting of lithium chloride and lithium acetate is still more preferable.

In addition, it is preferable that the lithium salt compound has a low solubility of lithium difluorophosphate with respect to a compound (a compound other than lithium difluorophosphate) which is generated as a by-product by a reaction between the lithium salt compound and the difluorophosphate ester represented by the general formula (1A), and it is easy to remove a compound (a compound other than lithium difluorophosphate) which is generated as a by-product, from the viewpoint of improving yield and purity of lithium difluorophosphate, and specifically, lithium chloride is preferable.

The lithium salt compound may be used alone or in combination.

In the production method of the present disclosure, among the difluorophosphate ester represented by the general formula (1A), the lithium salt compound, and the nonaqueous organic solvent, the lithium salt compound is most likely to bring water into the reaction system. Therefore, it is important to reduce the amount of water in the lithium salt compound before the reaction in order to reduce the amount of water in the total amount of the raw materials before the reaction to 7000 ppm by mass or less.

The amount of water in the lithium salt compound before the reaction is preferably 3000 ppm by mass or less, more preferably 2500 ppm by mass or less, still more preferably 2000 ppm by mass or less, particularly preferably 1000 ppm by mass or less, and most preferably 600 ppm by mass or less.

The amount of water in the lithium salt compound before the reaction can be reduced, for example, by drying a lithium salt compound having a high amount of water at a temperature of 100° C. to 200° C. under reduced pressure for a certain period of time.

<Nonaqueous Organic Solvent>

The nonaqueous organic solvent used in the production method of the present disclosure is not particularly limited, but is preferably at least one selected from the group consisting of carbonate esters, chain esters (chain carboxylic acid esters), ethers, and ketones because commercially available products having a low amount of water are easily available.

Examples of the carbonate esters include ethyl methyl carbonate, dimethyl carbonate, diethyl carbonate, methyl propyl carbonate, ethyl propyl carbonate, propylene carbonate, and butylene carbonate, and ethyl methyl carbonate, dimethyl carbonate, or diethyl carbonate is preferable.

Examples of the chain esters include ethyl acetate, methyl acetate, propyl acetate, methyl propionate, ethyl propionate, and propyl propionate, and ethyl acetate is preferable.

Examples of the ethers include dimethoxyethane, dimethoxymethane, tetrahydrofuran, and diethyl ether, and dimethoxyethane is preferable.

Examples of the ketones include acetone, ethyl methyl ketone, and diethyl ketone, and acetone is preferable.

The nonaqueous organic solvent is preferably at least one selected from the group consisting of carbonate esters, chain esters, and ketones, more preferably at least one selected from the group consisting of carbonate esters and chain esters, still more preferably carbonate esters having a low solubility of lithium difluorophosphate from the viewpoint of improving the yield of the obtained lithium difluorophosphate, and particularly preferably ethylmethyl carbonate, dimethyl carbonate, or diethyl carbonate.

In the production method of the present disclosure, it is preferable that the amount of water brought into the reaction system from the nonaqueous organic solvent is also small from the viewpoint of preventing the generation of hydrogen fluoride and improving the purity of lithium difluorophosphate. From the viewpoint of setting the amount of water in the total amount of the raw materials before the reaction to 7000 ppm by mass or less, the amount of water in the nonaqueous organic solvent before the reaction is preferably 0.5 mass % (5000 ppm by mass) or less, more preferably 0.1 mass % (1000 ppm by mass) or less, still more preferably 0.05 mass % (500 ppm by mass) or less, and particularly preferably 0.02 mass % (200 ppm by mass) or less.

<Reaction Conditions>

In the reaction in which the difluorophosphate ester represented by the general formula (1A) and the lithium salt compound are reacted in the nonaqueous organic solvent, a charging ratio of the difluorophosphate ester represented by the general formula (1A) and the lithium salt compound is preferably 1.0:0.7 to 1.0:1.5, and more preferably 1.0:0.9 to 1.0:1.2 in terms of molar ratio.

The amount of the nonaqueous organic solvent to be used in the above reaction is preferably such that a concentration of the difluorophosphate ester represented by the general formula (1A) in the nonaqueous organic solvent is 5 mass % to 25 mass %.

A temperature of the reaction solution in the above reaction is preferably −10° C. to 120° C., and more preferably from 0 to 60° C.

In the production method of the present disclosure, the reaction in which the difluorophosphate ester represented by the general formula (1A) and the lithium salt compound are reacted in the nonaqueous organic solvent is preferably performed under the protection of an inert gas from the viewpoint of preventing the formation of by-products by preventing the increase in the amount of water in the reaction system. Specifically, performing the reaction under the protection of an inert gas means performing the handling of the raw materials, the solvent, and the reaction vessel to be used under an inert gas atmosphere. The inert gas preferably has a dew point of −40° C. or less. Preferred examples of the inert gas include nitrogen gas.

[Method for Producing Nonaqueous Electrolytic Solution and Method for Producing Nonaqueous Secondary Battery]

The present disclosure also relates to a method for producing a nonaqueous electrolytic solution using lithium difluorophosphate obtained by the method for producing lithium difluorophosphate of the present disclosure, and a method for producing a nonaqueous secondary battery using the nonaqueous electrolytic solution Obtained by the above production method.

Lithium difluorophosphate is added as an additive to a nonaqueous electrolytic solution battery in order to improve the performance of a nonaqueous electrolytic solution battery such as a lithium ion secondary battery, but the amount of the lithium difluorophosphate to be used is usually 0.5 mass % to 1.5 mass % with respect to the nonaqueous electrolytic solution since the solubility in the solvent in the nonaqueous electrolytic solution is low.

When the amount of the lithium difluorophosphate to be added to the nonaqueous electrolytic solution is 1.0 mass % and the concentration of hydrogen fluoride to be mixed into the lithium difluorophosphate is about 3000 ppm by mass, a concentration of free acid (mainly hydrogen fluoride) in the nonaqueous electrolytic solution is increased by about 30 ppm by mass.

Since a standard of the concentration of free acid (hydrogen fluoride) in a general nonaqueous electrolytic solution is about 40 ppm by mass, there is a concern that an allowable value of hydrogen fluoride contained from other raw materials is significantly limited, and stable production of a nonaqueous electrolytic solution may be significantly hindered when the concentration of free acid (hydrogen fluoride) is increased by about 30 ppm by mass due to the lithium difluorophosphate.

Therefore, the concentration of hydrogen fluoride to be mixed into the lithium difluorophosphate is preferably as low as possible, and the amount of water in the total amount of raw materials before the reaction is preferably as low as possible from the viewpoint of reducing the concentration of the hydrogen fluoride.

The method for producing a nonaqueous electrolytic solution of the present disclosure preferably uses the lithium difluorophosphate obtained by the method for producing lithium difluorophosphate of the present disclosure using, as a raw material, the difluorophosphate ester represented by the general formula (1A) produced by the method for producing a difluorophosphate ester of the present disclosure described later. It is preferable to obtain a nonaqueous electrolytic solution by this method because of excellent production efficiency.

The method for producing a nonaqueous secondary battery of the present disclosure preferably uses the nonaqueous electrolytic solution obtained by the method for producing a nonaqueous electrolytic solution. It is preferable to obtain a nonaqueous secondary battery by this method because of excellent production efficiency.

[Lithium Difluorophosphate]

As a result of intensive studies to solve the problems described above, the present inventors have found that lithium difluorophosphate having a large d10 (that is, a large particle size of primary particles) and a small d90 (that is, a small particle size of secondary particles) generates a small amount of heat when dissolved in a nonaqueous electrolytic solution as an additive.

The lithium difluorophosphate of the present disclosure is lithium difluorophosphate in which a value of a relational expression (d90−d10)/MV represented by d90 which is a particle size where a volume cumulative distribution becomes 90%, d10 which is a particle size where a volume cumulative distribution becomes 10%, and MV which is a volume average particle size is 10 or less.

The lithium difluorophosphate is presumed to be a powder composed of primary particles and spherical secondary particles in which the primary particles are aggregated at room temperature and normal pressure.

In the powder composed of the primary particles and the spherical secondary particles in which the primary particles are aggregated, a relative particle amount in terms of volume shows two particle size peaks in particle size distribution measurement.

(Particle Size of Primary Particles and Secondary Particles)

In the powder composed of the primary particles and the secondary particles in which the primary particles are aggregated, the particle sizes of the primary particles and the secondary particles between samples of different lots can be compared with the values of d10 and d90 as a guide, respectively.

The d10 of the lithium difluorophosphate of the present disclosure is preferably 1.3 μm or more, and more preferably 1.7 μm or more.

The d90 of the lithium difluorophosphate of the present disclosure is preferably 170 μm or less, and more preferably 140 μm or less.

(Spread of Particle Size Distribution)

"(d90−d10)/MV" is an index indicating spread of a particle size distribution of lithium difluorophosphate. In the lithium difluorophosphate of the present disclosure, the value of (d90−d10)/MV is 10 or less, preferably 6.5 or less, and more preferably 5.8 or less.

By setting the value of (d90−d10)/MV of lithium difluorophosphate to 10 or less, a difference in particle size between the secondary particles and the primary particles of lithium difluorophosphate becomes small, that is, a degree of aggregation of the primary particles becomes small, and thus it is possible to prevent heat generation when the lithium difluorophosphate is dissolved as an additive in the nonaqueous electrolytic solution. On the other hand, when the value of (d90−d10)/MV exceeds 10, the heat generation is increased when the lithium difluorophosphate is dissolved as an additive in the nonaqueous electrolytic solution.

(Definition of Parameters for Particle Size Distribution Measurement)

Here, in the particle size distribution measurement, d10 and d90 are particle sizes where volume cumulative distributions are 10% and 90%, respectively, and MV is a volume average particle size. The smaller the (d90−d10)/MV is, the smaller the spread of the particle size distribution is, but a lower limit of (d90−d10)/MV is usually about 1 in consideration of manufacturing constraints and the like. Note that d90, d10, and MV can be measured by a laser diffraction scattering method using a laser diffraction particle size distribution analyzer.

In the lithium difluorophosphate of the present disclosure, the concentration of hydrogen fluoride to be mixed therein is preferably 4000 ppm by mass or less, and more preferably 2500 ppm by mass or less.

By setting the concentration of hydrogen fluoride in lithium difluorophosphate to 4000 ppm by mass or less, the concentration of hydrogen fluoride in the nonaqueous electrolytic solution prepared by adding the hydrogen fluoride can be lowered. It is known that the presence of a large amount of acid in an electrolytic solution of a battery is not preferable (e.g., Japanese Patent No, 5679719, JP-A-2001-307772),

[Method for Producing Difluorophosphate Ester]

As a result of intensive studies by the present inventors in order to solve the problems described above, it has been found that the cause of variation in the selectivity of fluorination depending on the manufacturer or the manufacturing lot of the fluorination agent is due to a difference in the content of hydrogen fluoride in the fluorination agent. Then, it has been found that the difluorophosphate ester can be obtained at a high selectivity of, for example, 75 mol % or more by fluorination of the dihalophosphate ester using a fluorinating agent having a concentration of contained hydrogen fluoride of 15 mol % or less.

In addition, it is confirmed that lithium difluorophosphate can be efficiently produced by synthesizing lithium difluorophosphate using the obtained difluorophosphate ester.

The present inventors attempts to fluorinate the dihalophosphate ester represented by the general formula (1) using hydrogen fluoride generally used for fluorination of a halogenated phosphate compound, and as a result, it has been found that a large amount of by-products such as hexafluorophosphoric acid and diethyl monofluorophosphate are unexpectedly generated by perfluorination or disproportionation, and the fluorination selectivity of the target difluorophosphate ester represented by the general formula (2) is lowered. In addition, it has been found that, among the by-products, a monofluorophosphate diester and the difluorophosphate ester represented by the general formula (2) are difficult to separate from each other, so that the amount of the monofluorophosphate diester as a by-product is increased, and a recovery rate of the difluorophosphate ester in distillation purification is decreased when the proportion of the monofluorophosphate diester in the obtained fluoride exceeds 5 mol %.

In the method for producing a difluorophosphate ester of the present disclosure, by adjusting the concentration of hydrogen fluoride contained in the fluorinating agent to be used to 15 mol % or less, the formation of the monofluorophosphate diester as a by-product is prevented, and the difluorophosphate ester represented by the general formula (2) is stably obtained at a high selectivity and a high yield.

[Step 1]

The present disclosure provides a method for producing a difluorophosphate ester represented by the following general formula (2). The method includes a step 1 of allowing a dihalophosphate ester represented by the following general formula (1) to react with a fluorinating agent having a concentration of contained hydrogen fluoride of 15 mol % or less in a nonaqueous organic solvent (a).

<Dihalophosphate Ester Represented by General Formula (1) and Difluorophosphate Ester Represented by General Formula (2)>

(1)

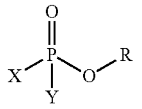

(2)

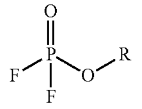

[In general formula (1), X represents a fluorine atom, a chlorine atom, a bromine atom, or an iodine atom, and Y represents a chlorine atom, a bromine atom, or an iodine atom. In general formulae (1) and (2), R represents a hydrocarbon group having 1 to 15 carbon atoms, and any hydrogen atom of the hydrocarbon group may be substituted with a halogen atom.]

In general formula (1), X represents a fluorine atom, a chlorine atom, a bromine atom, or an iodine atom, and Y represents a chlorine atom, a bromine atom, or an iodine atom. X and Y are preferably chlorine atoms.

In general formulae (1) and (2), R represents a hydrocarbon group having 1 to 15 carbon atoms, and any hydrogen atom of the hydrocarbon group may be substituted with a halogen atom.

In the general formulae (1) and (2), R represents the same group.

The hydrocarbon group having 1 to 15 carbon atoms and represented by R may be linear, branched, or cyclic, and may have a multiple bond. The hydrocarbon group may be either an aliphatic hydrocarbon group or an aromatic hydrocarbon group. Specific examples of the hydrocarbon group having 1 to 15 carbon atoms represented by R include an alkyl group having 1 to 15 carbon atoms, an alkenyl group having 2 to 15 carbon atoms, an alkynyl group having 2 to 15 carbon atoms, a cycloalkyl group having 3 to 15 carbon atoms, an aryl group having 6 to 15 carbon atoms, and an aralkyl group having 7 to 15 carbon atoms, and an alkyl group having 1 to 15 carbon atoms, or an aryl group having 6 to 15 carbon atoms is preferable.

Examples of the alkyl group having 1 to 15 carbon atoms include a methyl group, an ethyl group, a n-propyl group, an i-propyl group, a n-butyl group, a s-butyl group, a t-butyl group, a n-pentyl group, a n-hexyl group, and a n-dodecyl group, and an alkyl group having 1 to 10 carbon atoms is preferable, and a methyl group, an ethyl group, a n-propyl group, or an i-propyl group is preferable.

Examples of the aryl group having 6 to 15 carbon atoms include a phenyl group, a naphthyl group, and an anthryl group, and a phenyl group is preferable.

In addition, any hydrogen atom of the hydrocarbon group represented by R may be substituted with a halogen atom. Examples of the halogen atom include a fluorine atom, a chlorine atom, a bromine atom and an iodine atom, and a fluorine atom is preferable.

R is preferably an unsubstituted alkyl group having 1 to 15 carbon atoms or an unsubstituted aryl group having 6 to 15 carbon atoms, and more preferably an unsubstituted alkyl group having 1 to 10 carbon atoms or an unsubstituted phenyl group.

The method for synthesizing the dihalophosphate ester represented by the general formula (1) is not particularly limited. As an example, a method for synthesizing a dichlorophosphate ester is given, for example, by dissolving phosphorus oxychloride in a nonaqueous organic solvent, dropping an equimolar mixture of alcohol corresponding thereto and triethylamine while maintaining a liquid temperature at 5° C. or lower, removing triethylamine hydrochloride by filtration, and further performing distillation under reduced pressure.

When the nonaqueous organic solvent is a solvent having a high boiling point such as propylene carbonate (hereinafter, may be referred to as "PC") or diethylene glycol diethyl ether (hereinafter, may be referred to as "DGDE"), the nonaqueous organic solvent and the dichlorophosphate ester can be easily separated by the distillation under reduced pressure, and thus the type of the nonaqueous organic solvent (a) used in the step 1 described later is not particularly limited. On the other hand, when the nonaqueous organic solvent is a solvent having a boiling point lower than that of the solvent (for example, ethyl methyl carbonate (hereinafter sometimes referred to as "EMC")), it takes a long time to completely separate the dichlorophosphate ester and the nonaqueous organic solvent by the distillation under reduced pressure. Therefore, it is preferable to proceed to the step 1 described later without completely separating the nonaqueous organic solvent. In this case, it is preferable that the type of the nonaqueous organic solvent (a) used in the step 1 described later is the same as the type of the nonaqueous organic solvent used in the synthesis of the dichlorophosphate ester in terms of easy control of the solvent composition.

<Fluorinating Agent>

In the step 1 of the method for producing a difluorophosphate ester of the present disclosure, a fluorinating agent having a concentration of contained hydrogen fluoride of 15 mol % or less is used as the fluorinating agent. The fluorinating agent having a concentration of contained hydrogen fluoride of 15 mol % or less refers to a fluorinating agent having a concentration of hydrogen fluoride of 15 mol % or less with respect to a total amount of the fluorinating agent. The hydrogen fluoride constituting the fluorination agent, which is an equimolar neutralized salt of a base and hydrogen fluoride, such as triethylamine monohydrofluoride, is not included in the hydrogen fluoride when the concentration of the contained hydrogen fluoride is calculated.

The fluorinating agent is not particularly limited, and examples thereof include at least one selected from a hydrofluoride of organic amine and inorganic fluoride. Since it is easy to keep the concentration of the contained hydrogen fluoride to 15 mol % or less, a hydrofluoride of organic amine is preferably at least one selected from the group consisting of triethylamine monohydrofluoride, tetramethylethylenediamine dihydrofluoride, and pyridine monohydrofluoride, and the inorganic fluoride is preferably at least one selected from the group consisting of ammonium fluoride, sodium fluoride, potassium fluoride, cesium fluoride, and zinc fluoride.

The concentration of hydrogen fluoride in the fluorinating agent used in the step 1 is 15 mol % or less, but is preferably 10 mol % or less, more preferably 5 mol % or less, and still more preferably 1 mol % or less, from the viewpoint of preventing the formation of by-products such as a monofluorophosphate diester and further improving the selectivity and yield of the difluorophosphate ester represented by the general formula (2).

In the present disclosure, the concentration of hydrogen fluoride contained in the fluorinating agent is a value measured by nonaqueous neutralization titration using triethylamine as a titration base and bromophenol blue as an indicator with respect to the fluorinating agent dissolved or dispersed in a nonaqueous organic solvent using a glass burette.

The nonaqueous organic solvent to be used is preferably acetone.

The fluorinating agent may be a commercially available product or may be synthesized.

The method for synthesizing the fluorinating agent is not particularly limited, but the fluorinating agent can be obtained, for example, by allowing hydrogen fluoride to react with a corresponding basic compound (e.g., triethylamine when the fluorinating agent is a triethylamine monohydrofluoride) in a reaction solvent. The reaction solvent is not particularly limited, but when it is difficult to completely separate the reaction solvent and the fluorinating agent by filtration or the like, or when a lot of time is required, it is preferable to use the same kind of reaction solvent as the nonaqueous organic solvent (a) to be described later which is used in the step 1, from the viewpoint of easily controlling the solvent composition.

<Nonaqueous Organic Solvent (a)>

The reaction in the step 1 is performed in the nonaqueous organic solvent (a).

The amount of water in the nonaqueous organic solvent (a) is preferably as small as possible because water causes generation of hydrogen fluoride, and the amount of water contained in the nonaqueous organic solvent (a) before the reaction is preferably 0.05 mass % or less.

Examples of the nonaqueous organic solvent (a) include esters such as carbonate esters and chain esters (chain carboxylic acid esters), ketones, ethers, nitriles such as acetonitrile. It is preferable that the nonaqueous organic solvent (a) is at least one selected from the group consisting of carbonate esters, chain esters, and ketones because the difluorophosphate ester can be easily obtained with a high selectivity.

The nonaqueous organic solvent (a) is preferably at least one selected from the group consisting of carbonate esters and chain esters.

The carbonate ester is preferably at least one selected from the group consisting of ethyl methyl carbonate, dimethyl carbonate, diethyl carbonate, methyl propyl carbonate, ethyl propyl carbonate, propylene carbonate, and butyl ene carbonate.

The chain ester is preferably at least one selected from the group consisting of methyl acetate, ethyl acetate, propyl acetate, methyl propionate, ethyl propionate, and propyl propionate.

In another preferred embodiment, in the step 1, the fluorinating agent is at least one selected from sodium fluoride, ammonium fluoride, triethylamine monohydrofluoride, and tetramethylenediamine dihydrofluoride, and the nonaqueous organic solvent (a) is at least one selected from esters having a relative dielectric constant of 8 or less at 25° C., ethers having a relative dielectric constant of 8 or less at 25° C., and propylene carbonate. A combination of the fluorinating agent and the nonaqueous organic solvent (a) described above is preferable because the amount of the fluorinating agent to be used can be further reduced and the amount of waste due to the use of an excessive amount of the fluorinating agent can be reduced.

Preferable examples of the esters having a relative dielectric constant of 8 or less at 25° C. include at least one selected from ethyl methyl carbonate (EMC), dimethyl carbonate (hereinafter, referred to as "DMC"), diethyl carbonate, methyl propyl carbonate, ethyl propyl carbonate, ethyl formate, propyl formate, methyl acetate, ethyl acetate, propyl acetate, butyl acetate, isobutyl acetate, pentyl acetate, methyl propionate, ethyl propionate, propyl propionate, and dibutyl phthalate.

Preferable examples of the ethers having a relative dielectric constant of 8 or less at 25° C. include at least one selected from 1,2-dimethoxyethane, tetrahydrofuran, diethyl ether, and diethylene glycol diethyl ether (DGDE).

<Reaction Conditions of Step 1>

In the step 1, an equivalent of the fluorinating agent having a concentration of contained hydrogen fluoride of 15 mol % or less based on the dihalophosphate ester represented by the general formula (1) is preferably 2.0 to 3.0 when the dihalophosphate ester represented by the general formula (1) does not contain a fluorine atom, and is preferably 1.0 to 1.5 when the dihalophosphate ester represented by the general formula (1) contains a fluorine atom (when X in the general formula (1) is a fluorine atom).

The amount of the nonaqueous organic solvent (a) to be used in the reaction of the step 1 is preferably such that the concentration of the dihalophosphate ester represented by the general formula (1) in the nonaqueous organic solvent (a) is 0.01 g/mL to 0.4 g/mL.

A temperature of the reaction solution at this time is preferably −30° C. to 100° C., and more preferably −10° C. to 50° C.

The step 1 is preferably performed under the protection of the inert gas from the viewpoint of preventing the formation of by-products by preventing the increase in the amount of water in the reaction system. Specifically, performing the reaction under the protection of an inert gas means performing the handling of the raw materials, the solvent, and the reaction vessel to be used under an inert gas atmosphere. The inert gas preferably has a dew point of −40° C. or less. Preferred examples of the inert gas include nitrogen gas.

It is also possible to use a catalyst in the reaction in the step 1, but it is preferable not to use a catalyst in the reaction in the step 1.

An aspect is also preferable in which the fluorinating agent is at least one selected from sodium fluoride, ammonium fluoride, cesium fluoride, zinc fluoride, a triethylamine monohydrofluoride, and a tetramethylethylenediamine dihydrofluoride, and the nonaqueous organic solvent (a) is at least one selected from an ester having a relative dielectric constant of 8 or less at 25° C. and an ether having a relative dielectric constant of 8 or less at 25° C.

The ester having a relative dielectric constant of 8 or less at 25° C. is preferably at least one selected from ethyl methyl carbonate, dimethyl carbonate, diethyl carbonate, methyl propyl carbonate, ethyl propyl carbonate, ethyl formate, propyl formate, methyl acetate, ethyl acetate, propyl acetate, butyl acetate, isobutyl acetate, pentyl acetate, methyl propionate, ethyl propionate, propyl propionate, and dibutyl phthalate.

The ether having a relative dielectric constant of 8 or less at 25° C. is preferably at least one selected from 1,2-dimethoxyethane, tetrahydrofuran, diethyl ether, and diethylene glycol diethyl ether.

[Method for Producing Lithium Difluorophosphate]

In addition, the present disclosure provides a method for producing lithium difluorophosphate. The method includes any one of the following steps 2 to 4, using the difluorophosphate ester represented by the general formula (2) produced in the step 1 as a raw material.

Hereinafter, the steps 2 to 4 will be described in detail.

[Step 2]

The step 2 is a step of allowing the difluorophosphate ester represented by the general formula (2) produced in the step 1 and a lithium salt compound (b) to react with water in a nonaqueous organic solvent (b).

The nonaqueous organic solvent (b) in the step 2 is preferably at least one selected from the group consisting of esters, n-hexane, cyclohexane, n-heptane, isoheptane, benzene, toluene, xylene, acetonitrile, dimethyl ether, diethyl ether, ethylene glycol dimethyl ether, ethylene glycol diethyl ether, propylene glycol dimethyl ether, diethylene glycol dimethyl ether, anisole, phenetole, and tetrahydrofuran.

Examples of the esters include cyclic carbonate esters, chain carbonate esters, chain esters (chain carboxylic acid esters), and cyclic esters (cyclic carboxylic acid esters).

The cyclic carbonate ester is preferably at least one selected from the group consisting of propylene carbonate and butylene carbonate.

The chain carbonate ester is preferably at least one selected from the group consisting of ethylmethyl carbonate, dimethyl carbonate, diethyl carbonate, methylpropyl carbonate, and ethylpropyl carbonate.

The chain ester is preferably at least one selected from the group consisting of methyl acetate, ethyl acetate, propyl acetate, methyl propionate, ethyl propionate, and propyl propionate.

The cyclic ester is preferably at least one selected from the group consisting of γ-butyrolactone and γ-valerolactone.

The lithium salt compound (b) in the step 2 is preferably at least one selected from the group consisting of lithium chloride, lithium bromide, lithium fluoride, lithium iodide, lithium hydroxide, lithium carbonate, lithium bicarbonate, lithium phosphate, lithium dihydrogen phosphate, dilithium hydrogen phosphate, lithium metaphosphate, lithium acetate, and lithium sulfate.

A molar ratio of the difluorophosphate ester represented by the general formula (2), the lithium salt compound (b), and water in the step 2 is preferably 1:2:2 to 1:1:0.01.

The amount of the nonaqueous organic solvent (b) to be used in the step 2 is preferably such that the concentration of the difluorophosphate ester represented by the general formula (2) in the nonaqueous organic solvent (b) is 0.01 g/mL to 0.4 g/mL. In the step 2, a total amount of the difluorophosphate ester represented by the general formula (2), the lithium salt compound (b), water, and the nonaqueous organic solvent (b) before the reaction may be referred to as "a total amount of raw materials before the reaction in the step 2".

A temperature of the reaction solution in the step 2 is preferably −10° C. to 120° C.

The step 2 is preferably performed under protection of an inert gas from the viewpoint of preventing oxidation of the nonaqueous organic solvent (b) by oxygen. Preferred examples of the inert gas include nitrogen gas.

[Step 3]

The step 3 is a step of allowing the difluorophosphate ester represented by the general formula (2) produced in the step 1 to react with a lithium salt compound (c) in a nonaqueous organic solvent (c).

The amount of water in the total amount of the difluorophosphate ester represented by the general formula (2), the lithium salt compound (c), and the nonaqueous organic solvent (c) before the reaction in the step 3 (hereinafter, the total amount may be referred to as "a total amount of raw materials before the reaction in the step 3") is preferably 200 ppm by mass or less.

Here, since the difluorophosphate ester rapidly reacts with water to be hydrolyzed, water cannot be present in the difluorophosphate ester before the reaction. Therefore, assuming that "the amount of water contained in the difluorophosphate ester before the reaction" is "0 ppm by mass", the amount of water in the total amount of the raw materials before the reaction in the step 3 is calculated.

The amount of water contained in the total amount of the raw materials be the reaction in the step 3 is calculated by measuring and summing the amount of water in each of the lithium salt compound and the nonaqueous organic solvent (c) using a Karl Fischer Moisture Titrator. The amount of water in the lithium salt compound is a value obtained by connecting an Evaporator to the Karl Fischer Moisture Titrator and measuring the amount of water at a set temperature of 150° C.

It is preferable that the amount of water contained in the total amount of the difluorophosphate ester represented by the general formula (2), the lithium salt compound (c), and the nonaqueous organic solvent (c) before the reaction in the step 3 is 145 ppm by mass or less because the amount of hydrogen fluoride to be mixed into lithium difluorophosphate can be reduced.

The lithium salt compound (c) in the step 3 is preferably at least one selected from the group consisting of lithium chloride, lithium bromide, lithium fluoride, lithium carbonate, lithium acetate, and lithium propionate.

In the step 3, among the difluorophosphate ester represented by the general formula (2), the lithium salt compound (c), and the nonaqueous organic solvent (4 the lithium salt compound (c) having extremely high hygroscopicity is most likely to bring water into the reaction system. Therefore, it is important to reduce the amount of water in the lithium salt compound before the reaction in order to reduce the amount of water in the total amount of the raw materials before the reaction in the step 3 to 200 ppm by mass or less.

The amount of water in the lithium salt compound before the reaction is preferably 3000 ppm by mass or less, more preferably 2500 ppm by mass or less, and still more preferably 1000 ppm by mass or less.

The amount of water in the nonaqueous organic solvent (c) in the step 3 is preferably as small as possible because water causes generation of hydrogen fluoride, and the amount of water contained in the nonaqueous organic solvent (c) before the reaction is preferably 0.05 mass % (500 ppm by mass) or less.

The nonaqueous organic solvent (c) in the step 3 is preferably at least one selected from the group consisting of esters, ethers, and ketones because a commercially available product having a low amount of water is easily available.

The nonaqueous organic solvent (c) in the step 3 preferably contains esters.

The esters may be used alone or in combination.

Examples of the esters include cyclic carbonate esters, chain carbonate esters, chain esters, and cyclic esters.

The cyclic carbonate ester is preferably at least one selected from the group consisting of propylene carbonate and butylene carbonate.

The chain carbonate ester is preferably at least one selected from the group consisting of ethylmethyl carbonate, dimethyl carbonate, diethyl carbonate, methylpropyl carbonate, and ethylpropyl carbonate.

The chain ester is preferably at least one selected from the group consisting of methyl acetate, ethyl acetate, propyl acetate, methyl propionate, ethyl propionate, and propyl propionate.

The cyclic ester is preferably at least one selected from the group consisting of γ-butyrolactone and γ-valerolactone.

In the step 3, an equivalent of the lithium salt compound (c) to the difluorophosphate ester represented by the general formula (2) is preferably 0.7 to 1.5.

The amount of the nonaqueous organic solvent (c) to be used in the step 3 is preferably such that the concentration of the difluorophosphate ester represented by the general formula (2) in the nonaqueous organic solvent is 0.01 g/mL to 0.4 g/mL.

A temperature of the reaction solution is preferably −10° C. to 120° C.

The step 3 is preferably performed under the protection of the inert gas as in the step 1.

[Step 4]

The step 4 is a step of chlorinating the difluorophosphate ester represented by the general formula (2) produced in the step 1 with a chlorinating agent to convert the difluorophosphate ester into monochloro difluoro phosphine oxide, then synthesizing difluorophosphoric acid by hydrolysis, and further performing neutralization.

The chlorinating agent in the step 4 is preferably phosphorus oxychloride.

The neutralization in the step 4 is preferably the neutralization of difluorophosphoric acid by addition of lithium hydride or lithium chloride.

The chlorination reaction, the hydrolysis reaction, and the neutralization reaction are preferably performed in the nonaqueous organic solvent (d).

The nonaqueous organic solvent (d) preferably contains esters.

The esters may be used alone or in combination.

Examples of the esters include cyclic carbonate esters, chain carbonate esters, chain esters (chain carboxylic acid esters), and cyclic esters (cyclic carboxylic acid esters).

The cyclic carbonate ester is preferably at least one selected from the group consisting of propylene carbonate and butylene carbonate.

The chain carbonate ester is preferably at least one selected from the group consisting of ethylmethyl carbonate, dimethyl carbonate, diethyl carbonate, methylpropyl carbonate, and ethylpropyl carbonate.

The chain ester is preferably at least one selected from the group consisting of methyl acetate, ethyl acetate, propyl acetate, methyl propionate, ethyl propionate, and propyl propionate.

The cyclic ester is preferably at least one selected from the group consisting of γ-butyrolactone and γ-valerolactone.

The amount of the nonaqueous organic solvent (d) to be used in step 4 is preferably such that the concentration of the difluorophosphate ester represented by the general formula (2) in the nonaqueous organic solvent is 0.01 g/mL to 0.4 g/mL.

The temperature of the reaction solution is preferably −10° C. to 60° C.

The step 4 is preferably performed under the protection of the inert gas as in the step 1.

The production of lithium difluorophosphate can be performed by various methods as shown in the steps 2 to 4, but the production method including the step 3 is preferable because lithium difluorophosphate is obtained with high yield and high purity and the concentration of acid to be mixed into lithium difluorophosphate is low.

[Method for Producing Nonaqueous Electrolytic Solution and Method for Producing Nonaqueous Electrolytic Solution Battery]

The present disclosure also relates to a method for producing a nonaqueous electrolytic solution using the lithium difluorophosphate obtained by the production method of the present disclosure, and a method for producing a nonaqueous electrolytic solution battery using the nonaqueous electrolytic solution obtained by the production method.

EXAMPLE

Hereinafter, the present disclosure will be specifically described with reference to examples, but the present disclosure is not limited to the examples. Raw materials and solvents were handled in a nitrogen atmosphere having a dew point of −50° C. or less. A fluororesin reactor and a glass reactor to be used were dried at 150° C. for 12 hours or more and then cooled to room temperature under a nitrogen stream having a dew point of −50° C. or less.

[Synthesis of Difluorophosphate Ester Represented by General Formula (1A)]

A difluorophosphate ester represented by the general formula (1A) was synthesized by a procedure described in Synthesis Examples 1 to 6 below.

Synthesis Example 1

To a 1 L fluororesin reactor, 500 mL of acetonitrile and 81.5 g (500 mmol) of ethyl dichlorophosphate were added, and the mixture was sufficiently mixed by stirring. After 174.3 g (3000 mmol) of potassium fluoride was added, stirring was continued at a liquid temperature of 25° C. for 12 hours. As a result of confirmation by $^{19}$F-NMR, 90 mol % of ethyl difluorophosphate, which is the target product, 4 mol % of potassium hexafluorophosphate, and 6 mol % of diethyl monofluorophosphate were found in the obtained reaction solution. Potassium chloride was removed by filtration, and then the residue was distilled under reduced pressure to obtain 46.8 g (360 mmol, yield 72%) of ethyl difluorophosphate.

Synthesis Example 2

To a 1 L fluororesin reactor, 500 mL of ethyl methyl carbonate (hereinafter referred to as EMC) and 81.5 g (500 mmol) of ethyl dichlorophosphate were added, and the mixture was sufficiently mixed by stirring, 28.0 g (1400 mmol) of hydrogen fluoride was added dropwise over 30 minutes while maintaining a liquid temperature at 20° C. or lower, then the liquid temperature was raised to 25° C., and stirring was continued for 24 hours. As a result of confirmation by $^{19}$F-NMR, 45 mol % of ethyl difluorophosphate, which is the target product, 30 mol % of hexafluorophosphoric acid, and 25 mol % of diethyl monofluorophosphate were found in the obtained reaction solution. Hydrochloric acid was removed by concentration under reduced pressure, and then the residue was distilled under reduced pressure to obtain 22.8 g (175 mmol, yield: 35%) of ethyl difluorophosphate.

Synthesis Example 3

To a 500 mL fluororesin reactor, 81.5 g (500 mmol) of ethyl dichlorophosphate and 94.0 g (500 mmol) of sodium hexafluorosilicate were added, and stirring was continued at 60° C. for 12 hours. As a result of confirmation by $^{19}$F-NMR, 87 mol % of ethyl difluorophosphate, which is the target product, 8 mol % of ethyl chlorofluorophosphate, and 5 mol % of difluorophosphoric acid were found in the obtained reaction solution. The reaction solution was distilled under reduced pressure to obtain 13.5 g (104 mmol, yield 21%) of ethyl difluorophosphate.

Synthesis Example 4

As a result of carrying out the reaction in the same procedure as in Synthesis Example 1 except that a raw material was changed from 81.5 g (500 mmol) of ethyl dichlorophosphate to 74.5 g (500 mmol) of methyl dichlorophosphate, methyl difluorophosphate was obtained in a yield of 24%.

Synthesis Example 5

As a result of carrying out the reaction in the same procedure as in Synthesis Example 1 except that a raw material was changed from 81.5 g (500 mmol) of ethyl dichlorophosphate to 88.5 g (500 mmol) of n-propyl dichlorophosphate, n-propyl difluorophosphate was obtained in a yield of 31%.

Synthesis Example 6

As a result of carrying out the reaction in the same procedure as in Synthesis Example 1 except that a raw material was changed from 81.5 g (500 mmol) of ethyl dichlorophosphate to 105.5 g (500 mmol) of phenyl dichlorophosphate, phenyl difluorophosphate was obtained in a yield of 31%.

[Synthesis of Lithium Difluorophosphate]

The difluorophosphate esters obtained in Synthesis Examples 1 to 6 and a lithium salt compound were reacted in a nonaqueous organic solvent to synthesize lithium difluorophosphate by the procedure in Examples 1 to 18 and Comparative Example 1 below.

An amount of water in the nonaqueous organic solvent was measured using a Karl Fischer Moisture Titrator (electric droplet standard MKC-610) manufactured by Kyoto Electronics Manufacturing Co., Ltd. The amount of water in the lithium salt compound was measured at a set temperature of 150° C. by connecting the Karl Fischer Moisture Titrator to an Evaporator (ADP-611) manufactured by Kyoto Electronics Manufacturing Co., Ltd.

A purity of the lithium difluorophosphate obtained by the reaction was determined by $^{19}$F-NMR measurement. A concentration of hydrogen fluoride mixed in lithium difluorophosphate was determined by nonaqueous neutralization titration using triethylamine as a base.

Example 1

To a 500 mL glass reactor, 100 mL of EMC (amount of contained water: 110 ppm by mass) and 4.2 g (100 mmol) of undried anhydrous lithium chloride (amount of contained water: 4850 ppm by mass) were added, and stirring was started at an internal temperature of 40° C. Thereto, 13.0 g (100 mmol) of ethyl difluorophosphate obtained by the procedure in Synthesis Example 1 was added over 1 hour. An amount of water in the total amount of the raw materials before the reaction was 270 ppm by mass.

Due to the addition of ethyl difluorophosphate, foaming due to the generation of chloroethane was observed. Thereafter, stirring was continued at an internal temperature of 40° C. for 12 hours. After the internal temperature was lowered to 25° C. or less, the precipitated solid was recovered by filtration, and dried under reduced pressure at 80° C., thereby obtaining lithium difluorophosphate having a purity of 97% at a yield of 98%. Main impurities were lithium monofluorophosphate ($Li_2PO_3F$) produced by decomposing lithium difluorophosphate with water, and lithium ethylmonofluorophosphate ($LiPO_2F(OCH_2CH_3)$) produced by allowing lithium difluorophosphate to react with ethanol as a by-product. The concentration of hydrogen fluoride mixed in the lithium difluorophosphate was measured by nonaqueous neutralization titration, and was found to be 2030 ppm by mass.

Example 2

As a result of proceeding with the reaction in the same manner as in Example 1 except that lithium chloride to be used was changed to one having an amount of water of 2150 ppm by mass (one obtained by drying lithium chloride having an amount of water of 4850 ppm by mass under reduced pressure at 150° C. for 2 hours) (the amount of water contained in the total amount of raw materials before the reaction being 170 ppm by mass), lithium difluorophosphate having a purity of more than 99% was obtained at a yield of 98% after filtration and drying under reduced pressure. The concentration of hydrogen fluoride mixed in the lithium difluorophosphate was 910 ppm by mass.

Example 3

As a result of proceeding with the reaction in the same manner as in Example 1 except that lithium chloride to be used was changed to one having an amount of water of 1200 ppm by mass (one obtained by drying lithium chloride having an amount of water of 4850 ppm by mass under reduced pressure at 150° C. for 3 hours) (the amount of water contained in the total amount of raw materials before the reaction being 140 ppm by mass), lithium difluorophosphate having a purity of more than 99% was obtained at a yield of 98% after filtration and drying under reduced pressure. The concentration of hydrogen fluoride mixed in the lithium difluorophosphate was 420 ppm by mass.

Example 4

As a result of proceeding with the reaction in the same manner as in Example 1 except that lithium chloride to be used was changed to one having an amount of water of 510 ppm by mass (one obtained by drying lithium chloride having an amount of water of 4850 ppm by mass under reduced pressure at 150° C. for 6 hours) (the amount of water contained in the total amount of raw materials before the reaction being 110 ppm by mass), lithium difluorophosphate having a purity of more than 99% was obtained at a yield of 98% after filtration and drying under reduced pressure. The concentration of hydrogen fluoride mixed in the lithium difluorophosphate was 230 ppm by mass.

Example 5

As a result of proceeding with the reaction in the same manner as in Example 4 except that ethyl difluorophosphate to be used was changed to one obtained in the procedure in Synthesis Example 2 (the amount of water contained in the total amount of raw materials before reaction being 110 ppm by mass), lithium difluorophosphate having a purity of more than 99% was obtained at a yield of 98% after filtration and drying under reduced pressure. The concentration of hydrogen fluoride mixed in the lithium difluorophosphate was 210 ppm by mass.

Example 6

As a result of proceeding with the reaction in the same manner as in Example 4 except that ethyl difluorophosphate to be used was changed to one obtained in the procedure in Synthesis Example 3 (the amount of water contained in the total amount of raw materials before reaction being 110 ppm by mass), lithium difluorophosphate having a purity of more than 99% was obtained at a yield of 98% after filtration and drying under reduced pressure. The concentration of hydrogen fluoride mixed in the lithium difluorophosphate was 250 ppm by mass.

Example 7

As a result of proceeding with the reaction in the same manner as in Example 4 except that a solvent to be used was changed from EMC to dimethyl carbonate (hereinafter referred to as DMC) having an amount of water of 120 ppm by mass (the amount of water contained in the total amount of the raw materials before reaction being 120 ppm by mass), lithium difluorophosphate having a purity of more than 99% was obtained at a yield of 98% after filtration and drying under reduced pressure. The concentration of hydrogen fluoride mixed in the lithium difluorophosphate was 230 ppm by mass.

Example 8

To a 500 mL glass reactor, 100 mL of ethyl acetate (amount of contained water: 95 ppm by mass) and 4.2 g (100 mmol) of lithium chloride (amount of contained water: 510 ppm by mass) were added, and stiffing was started at an internal temperature of 40° C., Thereto, 13.0 g (100 mmol) of ethyl difluorophosphate obtained by the procedure in Synthesis Example 1 was added over 1 hour. An amount of water in the total amount of the raw materials before the reaction was 100 ppm by mass.

Due to the addition of ethyl difluorophosphate, foaming due to the generation of chloroethane was observed, Thereafter, stirring was continued at the internal temperature of 40° C. for 12 hours. Chloroethane and ethyl acetate contained in the obtained solution were removed by heating under reduced pressure, and then the obtained solid was washed with EMC. Then, as a result of recovering the solid by filtration and drying the solid under heating and reduced pressure at 80° C., lithium difluorophosphate having a purity of more than 99% was obtained at a yield of 97%. The concentration of hydrogen fluoride mixed in the lithium difluorophosphate was measured by nonaqueous neutralization titration, and was found to be 200 ppm by mass.

Example 9

As a result of proceeding with the reaction in the same manner as in Example 8 except that a solvent to be used was changed from ethyl acetate to acetone having an amount of water of 130 ppm by mass (the amount of water contained in the total amount of the raw materials before reaction being 130 ppm by mass), lithium difluorophosphate having a purity of more than 99% was obtained at a yield of 96% after filtration and drying under reduced pressure. The concentration of hydrogen fluoride mixed in the lithium difluorophosphate was 180 ppm by mass.

Example 10

As a result of proceeding with the reaction in the same manner as in Example 8 except that a solvent to be used was changed from ethyl acetate to dimethoxyethane (hereinafter referred to as DME) having an amount of water of 90 ppm by mass (the amount of water contained in the total amount of the raw materials before reaction being 100 ppm by mass), lithium difluorophosphate having a purity of 98% was obtained at a yield of 92% after filtration and drying under reduced pressure. The concentration of hydrogen fluoride mixed in the lithium difluorophosphate was 420 ppm by mass.

Example 11

To a 500 mL glass reactor, 100 mL of EMC (amount of contained water: 110 ppm by mass) and 6.6 g (100 mmol) of lithium acetate (amount of contained water: 3800 ppm by mass) were added, and stilling was started at an internal temperature of 40° C. Thereto, 13.0 g (100 mmol) of ethyl difluorophosphate obtained by the procedure in Synthesis Example 1 was added over 1 hour. An amount of water in the total amount of the raw materials before the reaction was 300 ppm by mass. Thereafter, stirring was continued at the internal temperature of 40° C. for 12 hours. After removing the by-produced ethyl acetate by concentration under reduced pressure, the precipitated solid was recovered by filtration and dried under reduced pressure at 80° C., thereby obtaining lithium difluorophosphate having a purity of 97% at a yield of 95%. Main impurities were lithium monofluorophosphate, which is a hydrolysate, and lithium ethylmonofluorophosphate produced by allowing lithium difluorophosphate to react with ethanol as a by-product. The concentration of hydrogen fluoride mixed in the lithium difluorophosphate was measured by nonaqueous neutralization titration, and was found to be 2570 ppm by mass.

Example 12

As a result of proceeding with the reaction in the same manner as in Example 11 except that lithium acetate to be used was changed to one having an amount of water of 1960 ppm by mass (one obtained by drying lithium acetate having an amount of water of 3800 ppm by mass under reduced pressure at 150° C. for 2 hours) (the amount of water contained in the total amount of raw materials before reaction being 200 ppm by mass), lithium difluorophosphate having a purity of more than 99% was obtained at a yield of 96% after filtration and drying under reduced pressure. The concentration of hydrogen fluoride mixed in the lithium difluorophosphate was 970 ppm by mass.

Example 13

As a result of proceeding with the reaction in the same manner as in Example 11 except that lithium acetate to be used was changed to one having an amount of water of 950 ppm by mass (one obtained by drying lithium acetate having an amount of water of 3800 ppm by mass under reduced pressure at 150° C. for 3 hours) (the amount of water contained in the total amount of raw materials before reaction being 140 ppm by mass), lithium difluorophosphate having a purity of more than 99% was obtained at a yield of 96% after filtration and drying under reduced pressure. The concentration of hydrogen fluoride mixed in the lithium difluorophosphate was 530 ppm by mass.

Example 14

As a result of proceeding with the reaction in the same manner as in Example 11 except that lithium acetate to be used was changed to one having an amount of water of 450 ppm by mass (one obtained by drying lithium acetate having an amount of water of 3800 ppm by mass under reduced pressure at 150° C. for 6 hours) (the amount of water contained in the total amount of raw materials before reaction being 120 ppm by mass), lithium difluorophosphate having a purity of more than 99% was obtained at a yield of 95% after filtration and drying under reduced pressure. The concentration of hydrogen fluoride mixed in the lithium difluorophosphate was 280 ppm by mass.

Example 15

To a 500 mL glass reactor, 100 mL of EMC (amount of contained water: 110 ppm by mass) and 4.2 g (100 mmol) of lithium chloride (amount of contained water: 510 ppm by mass) were added, and stirring was started at an internal temperature of 40° C. Thereto, 11.6 g (100 mmol) of methyl difluorophosphate obtained by the procedure in Synthesis Example 4 was added over 1 hour. An amount of water in the total amount of the raw materials before the reaction was 110 ppm by mass.

Due to the addition of methyl difluorophosphate, foaming due to the generation of chloromethane was observed. Thereafter, stirring was continued at the internal temperature of 40° C. for 12 hours. The precipitated solid was recovered by filtration, and dried under reduced pressure at 80° C., and then lithium difluorophosphate having a purity of 99% more than was obtained at a yield of 98%. The concentration of hydrogen fluoride mixed in the lithium difluorophosphate was measured by nonaqueous neutralization titration, and was found to be 250 ppm by mass.

Example 16

To a 500 mL glass reactor, 100 mL of EMC (amount of contained water: 110 ppm by mass) and 4.2 g (100 mmol) of lithium chloride (amount of contained water: 510 ppm by mass) were added, and stirring was started at an internal temperature of 40° C. Thereto, 14.4 g (100 mmol) of n-propyl difluorophosphate obtained by the procedure in Synthesis Example 5 was added over 1 hour. An amount of water in the total amount of the raw materials before the reaction was 110 ppm by mass.

Thereafter, stirring was continued at the internal temperature of 40° C. for 12 hours. The precipitated solid was recovered by filtration, and dried under reduced pressure at 80° C., and then lithium difluorophosphate having a purity of more than 99% was obtained at a yield of 98%. The concentration of hydrogen fluoride mixed in the lithium difluorophosphate was measured by nonaqueous neutralization titration, and was found to be 210 ppm by mass.

Example 17

To a 500 mL glass reactor, 100 mL of EMC (amount of contained water: 110 ppm by mass) and 4.2 g (100 mmol) of lithium chloride (amount of contained water: 510 ppm by mass) were added, and stirring was started at an internal temperature of 40° C. Thereto, 17.8 g (100 mmol) of the phenyl difluorophosphate obtained by the procedure in Synthesis Example 6 was added over 1 hour. An amount of water in the total amount of the raw materials before the reaction was 110 ppm by mass.

Thereafter, stirring was continued at the internal temperature of 40° C. for 48 hours. The precipitated solid was recovered by filtration, and dried under reduced pressure at 80° C., and then lithium difluorophosphate having a purity of 98% was obtained at a yield of 97%, In addition, the concentration of hydrogen fluoride mixed in the lithium difluorophosphate was measured by nonaqueous neutralization titration, and was found to be 300 ppm by mass.

Example 18

To a 500 mL glass reactor, 100 mL of acetonitrile (amount of contained water: 280 ppm by mass) and 4.2 g (100 mmol) of lithium chloride (amount of contained water: 510 ppm by mass) were added, and stirring was started at an internal temperature of 40° C. Thereto, 13.0 g (100 mmol) of ethyl difluorophosphate obtained by the procedure in Synthesis Example 1 was added over 1 hour. An amount of water in the total amount of the raw materials before the reaction was 250 ppm by mass.

Due to the addition of ethyl difluorophosphate, foaming due to the generation of chloroethane was observed. Thereafter, stirring was continued at the internal temperature of 40° C. for 12 hours. Chloroethane and acetonitrile contained in the obtained solution were removed by heating under reduced pressure, and then the obtained solid was washed with EMC. Then, as a result of recovering the solid by filtration and drying the solid under heating at 80° C. and reduced pressure, lithium difluorophosphate having a purity of 96% was obtained at a yield of 95%. Main impurities were lithium monofluorophosphate produced by decomposing lithium difluorophosphate with water, and lithium ethylmonofluorophosphate produced by allowing lithium difluorophosphate to react with ethanol as a by-product. The concentration of hydrogen fluoride mixed in the lithium difluorophosphate was measured by nonaqueous neutralization titration, and was found to be 2800 ppm by mass.

Comparative Example 1

To a 500 mL glass reactor, 100 mL of EMC (amount of contained water: 110 ppm by mass), 4.2 g (100 mmol) of lithium chloride (amount of contained water: 510 ppm by mass), and 0.9 g (50 mmol) of water were added, and stirring was started at an internal temperature of 40° C. Thereto, 13.0 g (100 mmol) of ethyl difluorophosphate obtained by the procedure in Synthesis Example 1 was added over 1 hour. An amount of water in the total amount of the raw materials before the reaction was 7700 ppm by mass. Thereafter, stirring was continued at the internal temperature of 40° C. for 12 hours. After the internal temperature was lowered to 25° C. or less, the precipitated solid was recovered by filtration, and dried under reduced pressure at 80° C., thereby obtaining lithium difluorophosphate having a purity of 83% at a yield of 96%. Main impurities were lithium monofluorophosphate produced by decomposing lithium difluorophosphate with water, and lithium ethylmonofluorophosphate produced by allowing lithium difluorophosphate to react with ethanol as a by-product. The concentration of hydrogen fluoride mixed in the lithium difluorophosphate was measured by nonaqueous neutralization titration, and was found to be 4210 ppm by mass. When confirmed by $^{1}$H-NMR and $^{19}$F-NMR, it was confirmed that 0.5 mass % of ethanol was contained even after drying.

TABLE 1

| | Raw material before reaction | | | | | |
|---|---|---|---|---|---|---|
| | Difluorophosphate ester | | Lithium salt compound | | Nonaqueous organic solvent | |
| | Synthesis Example | R group in general formula (1A) | Type | Amount of contained water [ppm by mass] | Type | Amount of contained water [ppm by mass] |
| Example 1 | 1 | Ethyl | Lithium | 4850 | EMC | 110 |
| Example 2 | | | chloride | 2150 | EMC | 110 |
| Example 3 | | | | 1200 | EMC | 110 |
| Example 4 | | | | 510 | EMC | 110 |
| Example 5 | 2 | | | 510 | EMC | 110 |
| Example 6 | 3 | | | 510 | EMC | 110 |
| Example 7 | 1 | | | 510 | DMC | 120 |

TABLE 1-continued

| | | | | | | |
|---|---|---|---|---|---|---|
| Example 8 | | | | 510 | Ethyl acetate | 95 |
| Example 9 | | | | 510 | Acetone | 130 |
| Example 10 | | | | 510 | DME | 90 |
| Example 11 | | | Lithium | 3800 | EMC | 110 |
| Example 12 | | | acetate | 1960 | EMC | 110 |
| Example 13 | | | | 950 | EMC | 110 |
| Example 14 | | | | 450 | EMC | 110 |
| Example 15 | 4 | Methyl | Lithium | 510 | EMC | 110 |
| Example 16 | 5 | n-Propyl | chloride | 510 | EMC | 110 |
| Example 17 | 6 | Phenyl | | 510 | EMC | 110 |
| Example 18 | 1 | Ethyl | | 510 | Acetonitrile | 280 |
| Comparative Example 1 | 1 | Ethyl | | 510 | EMC | 110 |

| | Amount of water in total amount of raw materials before reaction [ppm by mass] | Presence or absence of water as raw material | Yield [%] | Purity [%] | Concentration of hydrogen fluoride [ppm by mass] |
|---|---|---|---|---|---|
| Example 1 | 270 | No | 98 | 97 | 2030 |
| Example 2 | 170 | No | 98 | >99 | 910 |
| Example 3 | 140 | No | 98 | >99 | 420 |
| Example 4 | 110 | No | 98 | >99 | 230 |
| Example 5 | 110 | No | 98 | >99 | 210 |
| Example 6 | 110 | No | 98 | >99 | 250 |
| Example 7 | 120 | No | 98 | >99 | 230 |
| Example 8 | 100 | No | 97 | >99 | 200 |
| Example 9 | 130 | No | 96 | >99 | 180 |
| Example 10 | 100 | No | 92 | 98 | 420 |
| Example 11 | 300 | No | 95 | 97 | 2570 |
| Example 12 | 200 | No | 96 | >99 | 970 |
| Example 13 | 140 | No | 96 | >99 | 530 |
| Example 14 | 120 | No | 95 | >99 | 280 |
| Example 15 | 110 | No | 98 | >99 | 250 |
| Example 16 | 110 | No | 98 | >99 | 210 |
| Example 17 | 110 | No | 97 | 98 | 300 |
| Example 18 | 250 | No | 95 | 96 | 2800 |
| Comparative Example 1 | 7700 | Yes | 96 | 83 | 4210 |

The results are shown in Table 1, In Table 1, the amount of water in the total amount of the raw materials before reaction in Comparative Example 1 indicates an amount including the amount of the added water.

In Comparative Example 1, since water is used as the raw material in the reaction, the amount of the raw material used in the reaction is larger than that in Examples, and the efficiency is poor with respect to the production method of Examples.

In comparison between Examples, in Examples 1 and 11 in which the amount of water contained in the total amount of raw materials before reaction was 270 ppm by mass and 300 ppm by mass, which were larger than those in the other Examples (the amount of water contained in the lithium salt compound was 4850 ppm by mass and 3800 ppm by mass, which were larger than those in the other Examples), lithium monofluorophosphate, which was a hydrolysate of lithium difluorophosphate, and ethyl lithium monofluorophosphate, which was produced by the reaction of lithium difluorophosphate and ethanol as a by-product, were present as impurities, and not only a decrease in purity due to a decrease in a selectivity was observed, but also the amount of mixed hydrogen fluoride was a very high value of 2000 ppm by mass or more.

When the amount of water contained in the lithium salt compound was reduced to about 2000 ppm by mass so that the amount of water contained in the total amount of raw materials before the reaction was 200 ppm by mass or less, hydrolysis of lithium difluorophosphate and decomposition of lithium difluorophosphate by by-produced ethanol were obviously prevented, and improvement in purity due to the decrease in lithium monofluorophosphate and lithium ethyl monofluorophosphate and the decrease in the concentration of hydrogen fluoride were observed (Examples 2 and 12). In addition, from the results of Examples 3, 4, 13, and 14, when the amount of water contained in the total amount of the raw materials before the reaction was further decreased (when the amount of water contained in the lithium salt compound was further decreased), the purity of the lithium difluorophosphate reached 99%, and further decrease in the concentration of hydrogen fluoride was observed. In particular, when the amount of water in the total amount of the raw materials before the reaction was set to about 100 ppm by mass (when the amount of water contained in the lithium salt compound was set to about 500 ppm by mass), the concentration of hydrogen fluoride could be prevented to a particularly low level, From these results, it was confirmed that even when the lithium salt compound was changed from lithium chloride to lithium acetate, lithium difluorophosphate was similarly obtained.

In Examples 11 to 14 in which lithium acetate was used, the yield was about 95%, which was lower than that in the case of using lithium chloride because the by-produced ethyl acetate has not been completely removed by concentration under reduced pressure, and lithium difluorophosphate, which should be deposited in almost an entire amount, is partially dissolved by ethyl acetate remaining in this liquid.

In Examples 4 to 6, the amount of water contained in the total amount of the raw material before the reaction was fixed to 110 ppm by mass (the amount of water contained in lithium chloride to be used was fixed to 510 ppm by mass), and raw material ethyl difluorophosphate produced by a different production method was use, but the difference in the method did not affect the yield, purity, and concentration of hydrogen fluoride mixed in the obtained lithium difluorophosphate. From the results of Examples 4, 7 to 10, it was confirmed that lithium difluorophosphate can be obtained in the same manner even when the nonaqueous organic solvent was changed from EMC to DMC, ethyl acetate, acetone, or DME. In the case of using ethyl acetate, acetone, and DME, it was considered that the yield was lower than the results of EMC and DMC because some of these solvents remained even after removal of the solvent, and a part of lithium difluorophosphate was dissolved in these solvents during the subsequent EMC washing and filtration, and removed to a filtrate side.

Even when a raw material substrate was changed from ethyl ester to methyl ester (Example 15), n-propyl ester (Example 16), or phenyl ester (Example 17), lithium difluorophosphate having a high purity of 98% or more was obtained at a high yield of 97% or more under the same conditions. It can be said that the difference in yield and purity of the lithiation reaction depending on the kind of the substrate is small.

Next, the particle size distribution of the lithium difluorophosphate obtained by each of the production methods of Example 1, Example 8, and Comparative Example 1 (referred to as Example A, Example B, and Example C, respectively) was measured by the following method. The results are shown in Table 2 below.

(Particle Size Distribution Measurement)

Using a laser diffraction particle size analyzer (SALD-2200 manufactured by Shimadzu Corporation), the particle size distribution of about 10 mg of the lithium difluorophosphate obtained in Example A, Example B, and Example C was measured in about 20 mL of a hexane solvent. During the measurement, a measurement cell was stirred, the light intensity distribution was adjusted to 50%, and the value was obtained with a refractive index of the target substance set to 1.35. From the measurement results, a particle size d10 where a cumulative volume from a small size side is 10%, a particle size d90 where a cumulative volume from a small size side is 90%, and a volume average particle size MV were obtained.

(Evaluation of Heat Generation During Dissolution of Lithium Difluorophosphate)

A solution was prepared by dissolving $LiPF_6$ as an electrolyte in a nonaqueous solvent of ethylene carbonate (EC) and ethyl methyl carbonate (EMC) (volume ratio EC:EMC=3:7) so as to have a concentration of 1.2 molt, the solution was divided into 20 mL each, and a temperature of each solution was adjusted to 30° C. to prepare a test solution.

Lithium difluorophosphate described in Table 2 (Example A, Example B, and Example C) was added to each of the above test solutions so as to have a concentration of 1.5 mass %, and the mixture was stirred and mixed to prepare a nonaqueous electrolytic solution.

Table 2 shows the results of measuring the temperature of the nonaqueous electrolytic solution after the addition of lithium difluorophosphate and the stirring for 5 minutes.

TABLE 2

| | Amount of water in total amount of raw materials before reaction [ppm by mass] | Presence or absence of water as raw material | Purity [%] | Concentration of hydrogen fluoride [ppm by mass] | (d90-d10)/MV | Temperature of electrolytic solution after preparation of electrolytic solution [° C.] |
|---|---|---|---|---|---|---|
| Example A | 270 | No | 97 | 2030 | 5.29 | 30.6 |
| Example B | 100 | No | >99 | 200 | 5.08 | 30.3 |
| Example C | 7700 | Yes | 83 | 4210 | 6.77 | 36.8 |

From the results in Table 2, the following was found.

In all of Example A (Example 1), Example B (Example 8), and Example C (Comparative Example 1), the value of (d90 d10)/MV of the obtained lithium difluorophosphate was 10 or less, and it was possible to prevent heat generation when the lithium difluorophosphate was dissolved in the nonaqueous electrolytic solution as an additive.

As the value of (d90−d10)/MV of lithium difluorophosphate was smaller, the heat generation when the lithium difluorophosphate was dissolved in the nonaqueous electrolytic solution as an additive tended to be prevented.

The value of (d90−d10)/MV was smaller as the value of amount of water in the total amount of raw materials before the reaction was lower.

The value of (d90−d10)/MV was smaller when there was no water as a raw material.

The value of (d90−d10)/MV was smaller as the purity of the product was higher.

The value of (d90−d10)/MV was smaller as the concentration of hydrogen fluoride in the product was lower.

Figure 2:
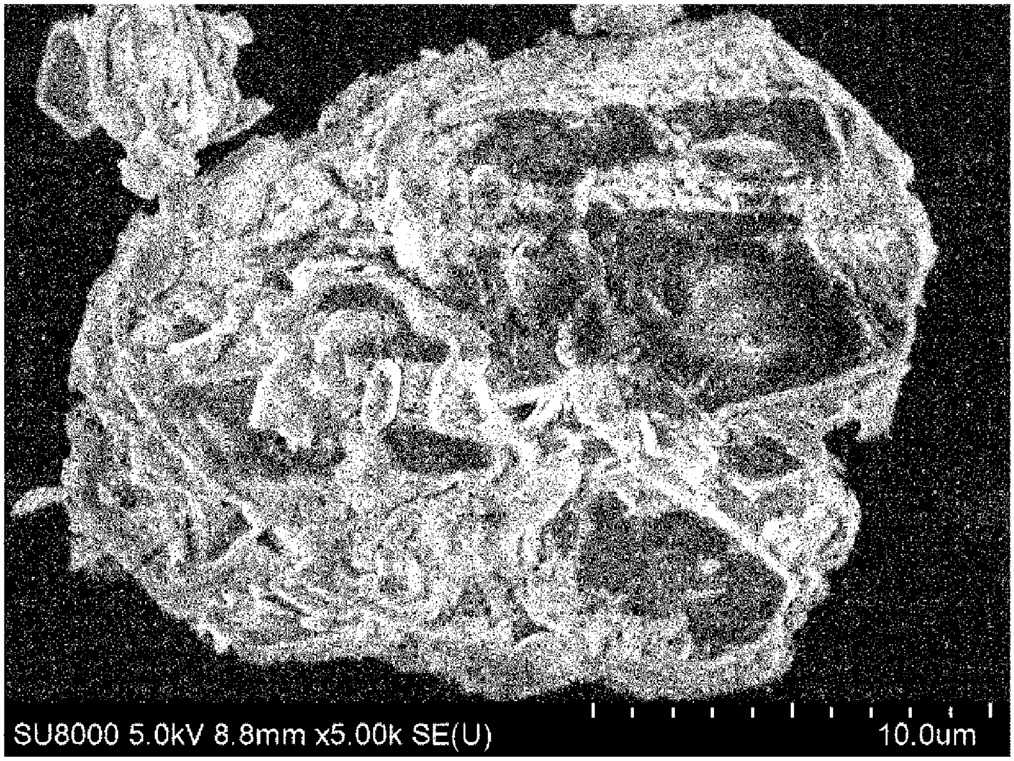
FIG. 2 is an SEM image of lithium difluorophosphate in Example A.
Figure 3:
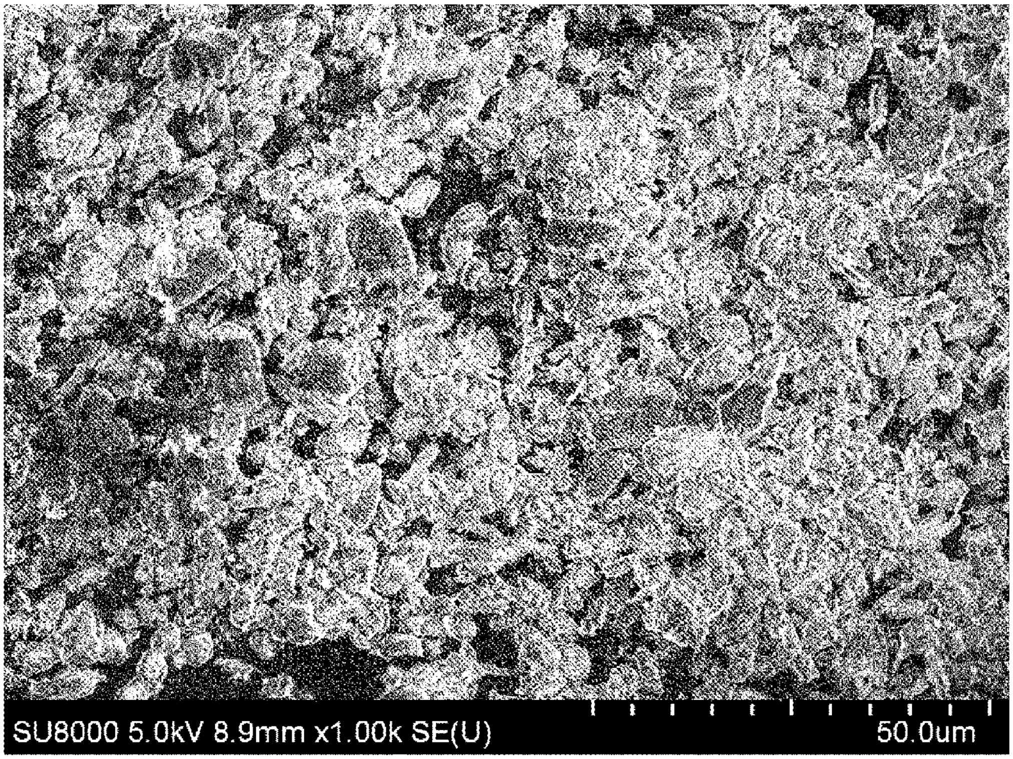
FIG. 3 is an SEM image of lithium difluorophosphate in Example C.
Figure 4:
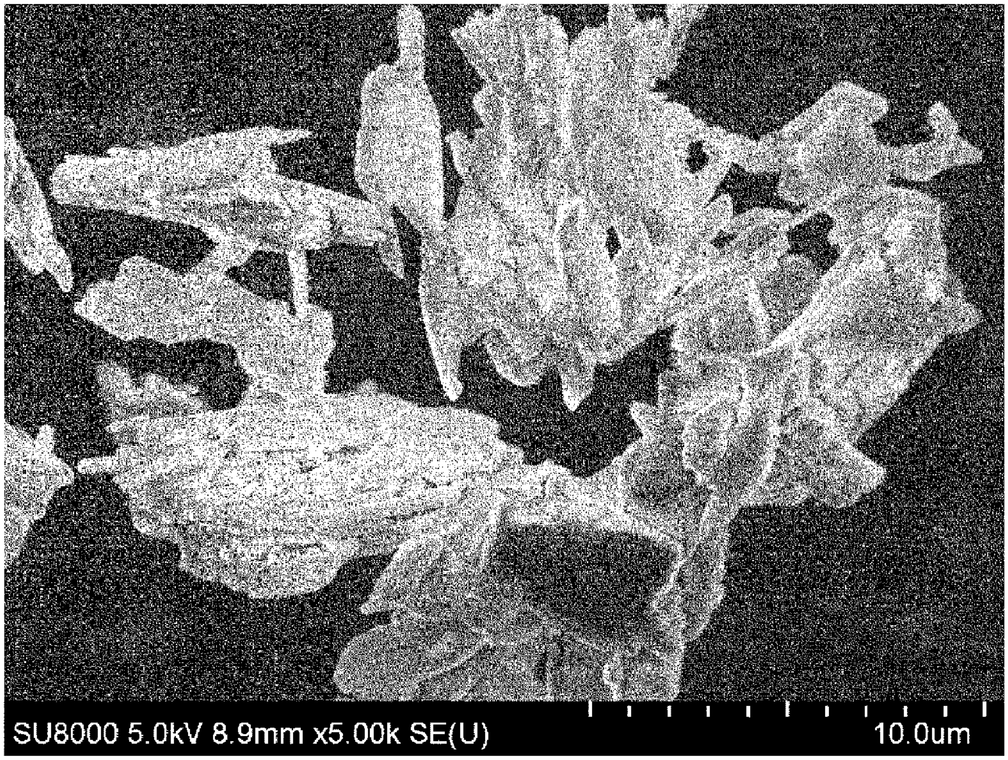
FIG. 4 is an SEM image of lithium difluorophosphate in Example C.

FIG. 1 and FIG. 2 show SEM images of lithium difluorophosphate in Example A. FIG. 3 and FIG. 4 show SEM images of lithium difluorophosphate in Example C.

[Fluorinating Agent]

Triethylamine monohydrofluoride and tetramethylethylenediamine dihydrofluoride were obtained by dissolving triethylamine or tetramethylethylenediamine in a nonaqueous organic solvent having an amount of water of 50 ppm by mass or less, and adding an equal number of moles of hydrogen fluoride to each of these bases while maintaining a liquid temperature at 5° C. or less. The nonaqueous organic solvent to be used was the same as a nonaqueous organic solvent (a) used in the step 1 described later. The concentration of hydrogen fluoride remaining in each of the obtained fluorinating agents was measured by nonaqueous neutralization titration using a glass burette, and was less than the lower limit of quantification (0.2 mol %). The nonaqueous neutralization titration was performed by partially sampling the reaction solution, diluting the reaction solution with acetone, titrating the reaction solution using triethylamine as a base and bromophenol blue as an indicator, and converting the measured value into a concentration based on hydrogen fluoride contained in the reaction solution. The subsequent nonaqueous neutralization titration was performed in the same manner.

In addition, ammonium fluoride was synthesized by dissolving hydrogen fluoride in a nonaqueous organic solvent and blowing an equimolar number of ammonia into the solution while maintaining the liquid temperature at 5° C. or lower. The nonaqueous organic solvent to be used was the same as a nonaqueous organic solvent (a) used in the step 1 described later. After the ammonium fluoride was recovered by filtration, the concentration of residual hydrogen fluoride was measured by nonaqueous neutralization titration, and was less than the lower limit of quantification (0.2 mol %). The ammonium fluoride was referred to as ammonium fluoride (1) (also referred to as $NH_4F(1)$).

In addition, sodium fluoride was synthesized by dissolving hydrogen fluoride in a nonaqueous organic solvent, and gradually adding an equal number of moles of sodium hydroxide while maintaining the liquid temperature at 5° C. or less. The nonaqueous organic solvent to be used was the same as a nonaqueous organic solvent (a) used in the step 1 described later. After the sodium fluoride was recovered by filtration and dried under reduced pressure, the concentration of residual hydrogen fluoride was measured by nonaqueous neutralization titration, and was less than the lower limit of quantification (0.2 mol %). The sodium fluoride was referred to as sodium fluoride (1) (also referred to as NaF (1)).

[Preparation of Fluorinating Agent Containing Hydrogen Fluoride]

Triethylamine was dissolved in a nonaqueous organic solvent having an amount of water of 50 ppm by mass or less, and a double molar amount of hydrogen fluoride was added thereto while maintaining a liquid temperature at 5° C. or less to obtain a triethylamine dihydrofluoride. A concentration of contained hydrogen fluoride measured by nonaqueous neutralization titration was 50 mol %. The nonaqueous organic solvent to be used was the same as a nonaqueous organic solvent (a) used in the step 1 described later.

Ammonium hydrogen fluoride (amount of contained hydrogen fluoride: 50 mol %) manufactured by FUJIFILM Wako Pure Chemical Industries, Ltd. was added to ammonium fluoride (1) to prepare ammonium fluoride (2) (also referred to as $NH_4F$ (2)) (number average molecular weight: 35.3) having a concentration of contained hydrogen fluoride of 10 mol % and ammonium fluoride (3) (also referred to as $NH_4F$ (3)) (number average molecular weight: 33.6) having a concentration of contained hydrogen fluoride of 20 mol %. The concentration of contained hydrogen fluoride was measured by nonaqueous neutralization titration.

Sodium hydrogen fluoride manufactured by FUJIFILM Wako Pure Chemical Industries, Ltd. was added to sodium fluoride (1) to prepare sodium fluoride (2) (also referred to as NaF (2)) (number average molecular weight: 39.8) having a concentration of contained hydrogen fluoride of 10 mol % and sodium fluoride (3) (also referred to as NaF (3)) (number average molecular weight. 37.6) having a concentration of contained hydrogen fluoride of 20 mol %. The concentration of contained hydrogen fluoride was measured by nonaqueous neutralization titration.

Methyl dichlorophosphate, which is a raw material (dihalophosphate ester represented by the general formula (1)) in step 1, was isolated and obtained by dissolving phosphorus oxychloride in PC, which is a nonaqueous organic solvent, dropping an equimolar mixed solution of alcohol (methanol) and triethylamine corresponding thereto while maintaining a liquid temperature at 5° C. or lower, removing triethylamine hydrochloride by filtration, and further performing distillation under reduced pressure. Similarly, ethyl dichlorophosphate, n-propyl dichlorophosphate, and phenyl dichlorophosphate were isolated and obtained by replacing the corresponding alcohols with ethanol, n-propanol, and phenol, respectively.

Comparative Example 1-1

To a 1 L fluororesin reactor, 500 mL of EMC and 81.5 g (500 mmol) of ethyl dichlorophosphate were added, and the mixture was sufficiently mixed by stirring. 28.0 g (1400 mmol) of hydrogen fluoride was added dropwise over 30 minutes while maintaining a liquid temperature at 20° C. or lower, then the liquid temperature was raised to 25° C., and stirring was continued for 24 hours. Analysis of the obtained reaction solution by $^{19}$F-NMR showed that a selectivity of ethyl difluorophosphate, which was a target product, was 45 mol %, while 30 mol % of hexafluorophosphoric acid and 25 mol % of diethyl monofluorophosphate were produced. As a result of confirmation by $^{31}$P-NMR, ethyl dichlorophosphate as a raw material was completely consumed.

After removing hydrochloric acid by concentration under reduced pressure, the residue was distilled under reduced pressure in a 10-stage distillation column to obtain 12.0 g (92.3 mmol, yield: 19%, distillation recovery rate: 41%) of ethyl difluorophosphate having a purity (measured by $^{19}$F-NMR and $^{31}$P-NMR) of 97% for fluorine and phosphorus component. The ethyl difluorophosphate was obtained as a mixed liquid with EMC. The numerical value of the yield or the like is a value obtained by subtracting the contained solvent, and the same applies hereinafter.

Comparative Example 1-2

To a 1 L fluororesin reactor, 350 mL of EMC and 81.5 g (500 mmol) of ethyl dichlorophosphate were added, and the mixture was sufficiently mixed by stirring. A mixed solution of 74.1 g (525 mmol) of a triethylamine dihydrofluoride (concentration of contained hydrogen fluoride: 50 mol %) and 150 mL of EMC was added dropwise over 30 minutes while maintaining a liquid temperature at 20° C. or lower, then the liquid temperature was raised to 25° C., and stirring was continued for 24 hours. Analysis of the obtained reaction solution by $^{19}$F-NMR showed that a selectivity of ethyl difluorophosphate, which was a target product, was 49 mol %, while 39 mol % of hexafluorophosphoric acid and 12 mol % of diethyl monofluorophosphate were produced. As a result of confirmation by $^{31}$P-NMR, ethyl dichlorophosphate as a raw material was completely consumed.

After removing hydrochloric acid by concentration under reduced pressure, triethylamine hydrochloride was removed by filtration. The obtained filtrate was distilled under reduced pressure in a 10-stage distillation column to obtain 12.7 g (98.0 mmol, yield 20%, distillation recovery rate 40%) of ethyl difluorophosphate having a purity (measured by $^{19}$F-NMR and $^{31}$P-NMR) of 98% for fluorine and phosphorus component. The ethyl difluorophosphate was obtained as a mixed liquid with EMC.

Comparative Example 1-3

To a 1 L fluororesin reactor, 500 mL of EMC and 81.5 g (500 mmol) of ethyl dichlorophosphate were added, and the mixture was sufficiently mixed by stirring. Thereto, 29.9 g (525 mmol) of ammonium hydrogen fluoride (concentration of contained hydrogen fluoride: 50 mol %) was added, and stirring was continued at a liquid temperature of 25° C. for 24 hours. Analysis of the obtained reaction solution by $^{19}$F-NMR showed that a selectivity of ethyl difluorophosphate, which was a target product, was 51 mol %, while 40 mol % of hexafluorophosphoric acid and 9 mol % of diethyl monofluorophosphate were produced. As a result of confirmation by $^{31}$P-NMR, ethyl dichlorophosphate as a raw material was completely consumed.

After the reaction, the same isolation operation as in Comparative Example 1-2 was carried out, and the same analysis was carried out to obtain 15.5 g (119.3 mmol, yield 23%, distillation recovery rate 45%) of ethyl difluorophosphate having a purity of 98% for fluorine and phosphorus component. The ethyl difluorophosphate was obtained as a mixed liquid with EMC.

Comparative Example 1-4

To a 1 L fluororesin reactor, 500 mL of EMC and 81.5 g (500 mmol) of ethyl dichlorophosphate were added, and the mixture was sufficiently mixed by stirring. Thereto, 34.5 g (1025 mmol) of ammonium fluoride (3) was added, and stirring was continued at a liquid temperature of 25° C. for 24 hours. Analysis of the obtained reaction solution by $^{19}$F-NMR showed that a selectivity of ethyl difluorophosphate, which was a target product, was 69 mol %, while 26 mol % of hexafluorophosphoric acid and 5 mol % of diethyl monofluorophosphate were produced. As a result of confirmation by $^{31}$P-NMR, ethyl dichlorophosphate as a raw material was completely consumed.

After the reaction, the same isolation operation as in Comparative Example 1-2 was carried out, and the same analysis was carried out to obtain 38.2 g (293.5 mmol, yield 59%, distillation recovery rate 85%) of ethyl difluorophosphate having a purity of more than 99% for fluorine and phosphorus component. The ethyl difluorophosphate was obtained as a mixed liquid with EMC.

Comparative Example 1-5

To a 1 L fluororesin reactor, 500 mL of EMC and 81.5 g (50 mmol) of ethyl dichlorophosphate were added, and the mixture was sufficiently mixed by stirring. Thereto, 35.5 g (1025 mmol) of sodium fluoride (3) was added, and stirring was continued at a liquid temperature of 25° C. for 24 hours. Analysis of the obtained reaction solution by $^{19}$F-NMR showed that a selectivity of ethyl difluorophosphate, which was a target product, was 66 mol %, while 30 mol % of hexafluorophosphoric acid and 4 mol % of diethyl monofluorophosphate were produced. As a result of confirmation by $^{31}$P-NMR, ethyl dichlorophosphate as a raw material was completely consumed.

After the reaction, the same isolation operation as in Comparative Example 1-2 was carried out, and the same analysis was carded out to obtain 37.3 g (287.0 mmol, yield 57%, distillation recovery rate 87%) of ethyl difluorophosphate having a purity of 99% or more for fluorine and phosphorus component. The ethyl difluorophosphate was obtained as a mixed liquid with EMC.

Example 1-1

To a 1 L fluororesin reactor, 500 mL of EMC and 81.5 g (500 mmol) of ethyl dichlorophosphate were added, and the mixture was sufficiently mixed by stirring. Thereto, 37.1 g (1050 mmol) of ammonium fluoride (2) was added, and stirring was continued at a liquid temperature of 25° C. for 24 hours. Analysis of the obtained reaction solution by $^{19}$F-NMR showed that a selectivity of ethyl difluorophosphate, which was a target product, was 91 mol %, while 6 mol % of hexafluorophosphoric acid and 3 mol % of diethyl monofluorophosphate were produced. As a result of confirmation by $^{31}$P-NMR, ethyl dichlorophosphate as a raw material was completely consumed.

Ammonium chloride was removed by filtration, and the obtained filtrate was distilled under reduced pressure in a. 10-stage distillation column to obtain 55.6 g (427.5 mmol, yield 85%, distillation recovery rate 94%) of ethyl difluorophosphate having a purity (measured by $^{19}$F-NMR, and $^{31}$P-NMR) of more than 99% for fluorine and phosphorus component.

Examples 1-2 to 1-4

As a result of conducting an experiment by changing only a fluorinating agent to be used as shown in Table 3 according to a procedure and analysis method shown in Example 1-1, it was confirmed that ethyl difluorophosphate was produced at a selectivity of 90 mol %, 95 mol %, and 96 mol %, respectively, and ethyl difluorophosphate having a purity of more than 99% for fluorine and phosphorus component was obtained at a yield of 85%, 90%, and 91% (distillation recovery rates of 94%, 95%, and 95%), respectively through the subsequent isolation operation, A concentration of hydrogen fluoride contained in the fluorinating agent used in Examples 1-3 and 1-4 was less than 0.2 mol %.

Example 1-5

To a 1 L fluororesin reactor, 500 mL of EMC and 81.5 g (500 mmol) of ethyl dichlorophosphate were added, and the mixture was sufficiently mixed by stirring. Thereto, 38.9 g (1050 mmol) of ammonium fluoride (1) was added, and stirring was continued at a liquid temperature of 25° C. for 24 hours. Analysis of the obtained reaction solution by $^{19}$F-NMR showed that a selectivity of ethyl difluorophosphate, which was a target product, was 98 mol %, while 2 mol % of diethyl monofluorophosphate was produced. As a result of confirmation by $^{31}$P-NMR, ethyl dichlorophosphate as a raw material was completely consumed.

Ammonium chloride was removed by filtration, and the obtained filtrate was distilled under reduced pressure in a 10-stage distillation column to obtain 60.5 g (465.0 mmol, yield 93%, distillation recovery rate 95%) of ethyl difluorophosphate having a purity (measured by $^{19}$F-NMR and $^{31}$P-NMR) of more than 99% for fluorine and phosphorus component.

Examples 1-6 to 1-9

As a result of conducting an experiment by changing only the nonaqueous organic solvent (a) to be used as shown in Table 3 according to a procedure and analysis method shown in Example 1-5, it was confirmed that ethyl difluorophosphate was produced at a selectivity of 97 mol %, 96 mol %, 92 mol %, and 83 mol %, respectively, and ethyl difluorophosphate having a purity of more than 99% for fluorine and phosphorus component was obtained at a yield of 92%, 90%, 86%, and 78% (distillation recovery rates of 95%, 94%, 94%, and 94%) through the subsequent isolation operation. In Table 3, "DMC" means dimethyl carbonate.

Example 1-10

An experiment was conducted by the same procedure and analysis method as in Example 1-5 except that a fluorinating agent was changed from ammonium fluoride (1) to sodium fluoride (1), it was confirmed that ethyl difluorophosphate was produced at a selectivity of 96 mol %, and ethyl difluorophosphate having a purity of more than 99% for fluorine and phosphorus component was obtained at a yield of 91% (distillation recovery rate of 95%) through the subsequent isolation operation.

Examples 1-1.1 and 1-12

As a result of conducting an experiment in the same procedure as in Example 1-10 except that the nonaqueous organic solvent (a) was changed from EMC to PC or acetonitrile, it was confirmed that ethyl difluorophosphate was produced at a selectivity of 96 mol % and 80 mol %, respectively, and ethyl difluorophosphate having a purity of more than 99% for fluorine and phosphorus component was obtained at a yield of 89% and 73% (distillation recovery rate of 93% and 92%) through the subsequent isolation operation.

Comparative Example 1-6

As a result of conducting an experiment by the same procedure and analysis method as in Comparative Example 1-1 except that the dihalophosphate ester represented by the general formula (1) was changed from 81.5 g (500 mmol) of ethyl dichlorophosphate to 74.5 g (500 mmol) of methyl dichlorophosphate, it was confirmed that methyl difluorophosphate was produced at a selectivity of 47 mol %, and methyl difluorophosphate having a purity of 98% for fluorine and phosphorus component was obtained at a yield of 18% (distillation recovery rate of 39%) through the subsequent isolation operation.

Example 1-13

As a result of conducting an experiment by the same procedure and analysis method as in Comparative Example 1-6 except that the fluorinating agent was changed from hydrogen fluoride to ammonium fluoride (1), it was confirmed that methyl difluorophosphate was produced at a selectivity of 97 mol %, and methyl difluorophosphate having a purity of more than 99% for fluorine and phosphorus component was obtained at a yield of 89% (distillation recovery rate of 92%) through the subsequent isolation operation.

Example 1-14

As a result of conducting an experiment by the same procedure and analysis method as in Example 1-13 except that the nonaqueous organic solvent (a) was changed from EMC to acetonitrile, it was confirmed that methyl difluorophosphate was produced at a selectivity of 78 mol %, and methyl difluorophosphate having a purity of more than 99% for fluorine and phosphorus component was obtained at a yield of 70% (distillation recovery rate of 90%) through the subsequent isolation operation.

Comparative Example 1-7

As a result of conducting an experiment by the same procedure and analysis method as in Comparative Example 1-2 except that the dihalophosphate ester represented by the general formula (1) was changed from 81.5 g (500 mmol) of ethyl dichlorophosphate to 88.5 g (500 mmol) of n-propyl dichlorophosphate, it was confirmed that n-propyl difluorophosphate was produced at a selectivity of 51 mol %, and n-propyl difluorophosphate having a purity of 98% for fluorine and phosphorus component was obtained at a yield of 20% (distillation recovery rate of 40%) through the subsequent isolation operation.

Example 1-15

As a result of conducting an experiment by the same procedure and analysis method as in Comparative Example 1-7 except that the fluorinating agent was changed from a triethylamine dihydrofluoride to ammonium fluoride (1), it was confirmed that n-propyl difluorophosphate was produced at a selectivity of 97 mol %, and n-propyl difluorophosphate having a purity of more than 99% for fluorine and phosphorus component was obtained at a yield of 90? (distillation recovery rate of 93%) through the subsequent isolation operation.

Example 1-16

As a result of conducting an experiment by the same procedure and analysis method as in Example 1-15 except that the nonaqueous organic solvent (a) was changed from EMC to PC, it was confirmed that n-propyl difluorophosphate was produced at a selectivity of 96 mol %, and n-propyl difluorophosphate having a purity of more than 99% for fluorine and phosphorus component was Obtained at a yield of 88% (distillation recovery rate of 92%) through the subsequent isolation operation.

Example 1-17

As a result of conducting an experiment by the same procedure and analysis method as in Example 1-15 except that the nonaqueous organic solvent (a) was changed from EMC to acetonitrile, it was confirmed that n-propyl difluorophosphate was produced at a selectivity of 77 mol %, and n-propyl difluorophosphate having a purity of more than 99% for fluorine and phosphorus component was obtained at a yield of 69% (distillation recovery rate of 90%) through the subsequent isolation operation.

Comparative Example 1-8

As a result of conducting an experiment by the same procedure and analysis method as in Comparative Example 1-3 except that the dihalophosphate ester represented by the general formula (1) was changed from 81.5 g (500 mmol) of ethyl dichlorophosphate to 105.5 g (500 mmol) of phenyl dichlorophosphate, it was confirmed that phenyl difluorophosphate was produced at a selectivity of 43 mol %, and a phenyl difluorophosphate having a purity of more than 99% for fluorine and phosphorus component was obtained at a yield of 17% (distillation recovery rate of 39%) through the subsequent isolation operation.

Example 1-18

As a result of conducting an experiment by the same procedure and analysis method as in Comparative Example 1-8 except that the fluorinating agent was changed from ammonium hydrogen fluoride (amount of contained hydrogen fluoride: 50 mol %) to ammonium fluoride (1), it was confirmed that phenyl difluorophosphate was produced at a selectivity of 89 mol %. As a result of $^{13}$P-NMR measurement at this point, the remaining of phenyl dichlorophosphate as a raw material was confirmed. Therefore, when a reaction time was extended by 48 hours, the selectivity was finally improved to 92 mol %. Subsequently, through an isolation operation, phenyl difluorophosphate having a purity of more than 99% for fluorine and phosphorus component was obtained at a yield of 83% (distillation recovery rate: 90%).

The results are shown in Table 3.

When ethyl dichlorophosphate were fluorinated using ammonium fluoride and sodium fluoride in which the content of hydrogen fluoride were less than 0.2 mol %, 10 mol %, or 20 mol % as fluorinating agents (Comparative Examples 1-4 and 1-5, Examples 1-1, 1-2, 1-5, and 1-10) in order to confirm a relationship between the amount of hydrogen fluoride and the selectivity of fluorination, it was confirmed that the lower the concentration of contained hydrogen fluoride was, the higher the selectivity to ethyl difluorophosphate was, and the less the amount of by-products such as hexafluorophosphoric acid, which are considered to be generated due to perfluorination or disproportionation, was.

TABLE 3

| | R group in general formulae (1) and (2) | Fluorinating agent Type | Concentration of contained hydrogen fluoride [mol %] | Nonaqueous organic solvent (a) | Selectivity (mol %) | Yield [%] | Distillation recovery rate | Purity of fluorine and phosphorus component [ %] |
|---|---|---|---|---|---|---|---|---|
| Comparative Example 1-1 | Ethyl | HF | 100 | EMC | 45 | 19 | 41 | 97 |
| Comparative Example 1-2 | | $Et_3N$•2HF | 50 | EMC | 49 | 20 | 40 | 98 |
| Comparative Example 1-3 | | $NH_4F$•HF | | EMC | 51 | 23 | 45 | 98 |
| Comparative Example 1-4 | | $NH_4F$(3) | 20 | EMC | 69 | 59 | 85 | >99 |
| Comparative Example 1-5 | | NaF(3) | | EMC | 66 | 57 | 87 | >99 |
| Example 1-1 | | $NH_4F$(2) | 10 | EMC | 91 | 85 | 94 | >99 |
| Example 1-2 | | NaF(2) | | EMC | 90 | 85 | 94 | >99 |
| Example 1-3 | | $Et_3N$•1HF | <0.2 | EMC | 95 | 90 | 95 | >99 |
| Example 1-4 | | TMEDA•2HF | | EMC | 96 | 91 | 95 | >99 |
| Example 1-5 | | $NH_4F$(1) | <0.2 | EMC | 98 | 93 | 95 | >99 |
| Example 1-6 | | | | DMC | 97 | 92 | 95 | >99 |
| Example 1-7 | | | | Ethyl acetate | 96 | 90 | 94 | >99 |
| Example 1-8 | | | | DGDE | 92 | 86 | 94 | >99 |
| Example 1-9 | | | | Acetonitrile | 83 | 78 | 94 | >99 |
| Example 1-10 | | NaF (1) | <0.2 | EMC | 96 | 91 | 95 | >99 |
| Example 1-11 | | | | PC | 96 | 89 | 93 | >99 |
| Example 1-12 | | | | Acetonitrile | 80 | 73 | 92 | >99 |
| Comparative Example 1-6 | Methyl | HF | 100 | EMC | 47 | 18 | 39 | 98 |
| Example 1-13 | | $NH_4F$(1) | <0.2 | EMC | 97 | 89 | 92 | >99 |
| Example 1-14 | | | | Acetonitrile | 78 | 70 | 90 | >99 |
| Comparative Example 1-7 | n-Propyl | $Et_3N$•2HF | 50 | EMC | 51 | 20 | 40 | 98 |
| Example 1-15 | | $NH_4F$(1) | <0.2 | EMC | 97 | 90 | 93 | >99 |
| Example 1-16 | | | | PC | 96 | 88 | 92 | >99 |
| Example 1-17 | | | | Acetonitrile | 77 | 69 | 90 | >99 |
| Comparative Example 1-8 | Pnenyi | $NH_4F$•HF | 50 | EMC | 43 | 17 | 39 | >99 |
| Example 1-18 | | $NH_4F$(1) | <0.2 | EMC | 92 | 83 | 90 | >99 |

In Table 3, $Et_3N$ represents triethylamine, TMEDA represents tetramethylethylenediamine, HF represents hydrogen fluoride, $NH_4F$ represents ammonium fluoride, and NaF represents sodium fluoride.

Since hydrogen fluoride is generally used for fluorination of a halogenated phosphate compound (halogen is chlorine or bromine), fluorination with hydrogen fluoride was first attempted as shown in Comparative Example 1-1, but unexpectedly, the selectivity of fluorination to the target product was as low as 45 mol %, and many by-products of hexafluorophosphoric acid and diethyl monofluorophosphate, which are considered to be generated by perfluorination or disproportionation, were observed.

Then, fluorination with a triethylamine dihydrofluoride was attempted with reference to fluorination conditions described in paragraphs [0079] to [0081] in WO 2015/122511 (Comparative Example 1-2). A high selectivity of 90 mol % or more was expected, but as a result, the selectivity was as low as 49 mol %. Even when the fluorinating agent was changed to ammonium hydrogen fluoride, the selectivity was similarly low (Comparative Example 1-3).

Next, when the fluorinating agent was changed from a triethylamine dihydrofluoride to a triethylamine monohydrofluoride (Example 1-3), the selectivity was 95 mol %, which was unexpectedly very high. When amine was changed from triethylamine to tetramethylethylenediamine, and a tetramethylethylenediamine dihydrofluoride was used as a fluorinating agent (Example 1-4), very good results were obtained with a selectivity of 96 mol %.

As can be seen from the results of Comparative Examples 1-2 and 1-3, even when the selectivity to ethyl difluorophosphate at the time of the reaction was as low as about 50 mol %, high-purity ethyl difluorophosphate having a purity of 98% for fluorine and phosphorus component could be obtained by the isolation operation after the reaction. However, since hexafluorophosphoric acid, which is a main by-product, is concentrated to a still residue during distillation, it is easy to separate hexafluorophosphoric acid from ethyl difluorophosphate, but it is difficult to separate hexafluorophosphoric acid from diethyl monofluorophosphate and ethyl difluorophosphate, which are both produced as by-products. (When the diethyl monofluorophosphate was contained in an amount of 12 mol %, a recovery rate at the time of distillation purification of ethyl difluorophosphate having a purity of 98% for fluorine and phosphorus component was 40%, and when the diethyl monofluorophosphate was contained in an amount of 9 mol %, the distillation recovery rate was 45%.)

In Comparative Examples 1-1 to 1-3, distillation purification in a 10-stage distillation column was required in order to increase the purity of ethyl difluorophosphate to 97% or more, but in Example 1-1 in which only 3 mol % of diethyl monofluorophosphate was contained, diethyl monofluorophosphate could be removed at a distillation recovery rate of 94% even in distillation in a 5-stage distillation column.

In addition, the dihalophosphate ester represented by the general formula (1) was fixed to ethyl dichlorophosphate, the fluorinating agent was fixed to ammonium fluoride, and the influence was investigated when the nonaqueous organic solvent (a) was changed (Examples 1-5 to 1-9). As a result, the selectivity was the best when using a carbonate ester or chain ester solvent, followed by DGDE and acetonitrile.

When the dihalophosphate ester represented by the general formula (1) was fixed to ethyl dichlorophosphate, the fluorinating agent was fixed to sodium fluoride, and the nonaqueous organic solvent (a) was changed (Examples 1-10 to 1-12), the same tendency was observed, and the selectivity was the best when using carbonate esters.

In addition, as can be seen from the results of Examples 1-13 to 1-18 and Comparative Examples 1-6 to 1-8, even when a substituent (group represented by R) of the dichlorophosphate ester as a raw material was changed, the tendency of the above results did not change, and fluorination at a high selectivity of 96 mol % or more was possible by using a fluorinating agent having a low concentration of contained hydrogen fluoride (here, less than 0.2 mol %) and a carbonate ester-based solvent (in Example 1-18, the fluorination rate was slow, and thus the raw material remained. Further, by extending the reaction time, the selectivity is improved to 92 mol % or more of a current level.)

Examples 1-9-1 and 1-12-1

Experiments were conducted in the same procedure and analysis method as in Examples 1-9 and 1-12, respectively, except that the amount of the fluorinating agent to be used was changed to 1.5 equivalents. The results are shown in Table 4 together with the results in Examples 1-5 to 1-8, 1-10, and 1-11,

Examples 1-19 and 1-20

Experiments were conducted in the same procedure and analysis method as in Example 1-3 except that the amount of the fluorinating agent to be used and the type of the nonaqueous organic solvent (a) were changed as shown in Table 4. The results are shown in Table 4 together with the results in Example 1-3.

Examples 1-21 and 1-22

Experiments were conducted in the same procedure and analysis method as in Example 1-4 except that the amount of the fluorinating agent to be used and the type of the nonaqueous organic solvent (a) were changed as shown in Table 4. The results are shown in Table 4 together with the results in Example 1-4.

TABLE 4

| | R group in general formulae (1) and (2) | Fluorinating agent | | | Nonaqueous organic solvent (a) | | | |
|---|---|---|---|---|---|---|---|---|
| | | Type | Concentration of contained hydrogen fluoride [mol %] | Equivalent | Type | Relative dielectric constant (25° C.) | Selectivity [mol %] | Yield [%] |
| Example 1-5 | Ethyl | $NH_4F$ (1) | <0.2 | 1.05 | EMC | About 3 | 98 | 93 |
| Example 1-6 | | | | 1.05 | DMC | About 3 | 97 | 92 |
| Example 1-7 | | | | 1.05 | Ethyl acetate | About 6 | 96 | 90 |
| Example 1-8 | | | | 1.05 | DGDE | About 7 | 92 | 86 |
| Example 1-9-1 | | | | 1.5 | Acetonitrile | About 37 | 89 | 83 |
| Example 1-10 | | NaF (1) | <0.2 | 1.05 | EMC | About 3 | 96 | 91 |
| Example 1-11 | | | | 1.05 | PC | About 64 | 96 | 89 |
| Example 1-12-1 | | | | 1.5 | Acetonitrile | About 37 | 88 | 83 |
| Example 1-3 | | $Et_3N$•1HF | <0.2 | 1.05 | EMC | About 3 | 95 | 90 |
| Example 1-19 | | | | 1.05 | PC | About 64 | 94 | 87 |
| Example 1-20 | | | | 1.1 | Acetonitrile | About 37 | 83 | 75 |
| Example 1-4 | | TMEDA•2HF | <0.2 | 1.05 | EMC | About 3 | 96 | 91 |
| Example 1-21 | | | | 1.05 | PC | About 64 | 96 | 88 |
| Example 1-22 | | | | 1.1 | Acetonitrile | About 37 | 80 | 72 |

As shown in Table 4, in Examples 1-5 to 1-7 in which an ester having a relative dielectric constant of 8 or less is used as the nonaqueous organic solvent (a) and in Example 1-8 in which an ether having a relative dielectric constant of 8 or less is used as the nonaqueous organic solvent (a), an excellent selectivity and yield can be achieved even when the amount of the fluorinating agent to be used was as relatively small as 1.05 equivalents On the other hand, in Example 1-9 in which acetonitrile (relative dielectric constant: about 37) was used as the nonaqueous organic solvent (a), the selectivity and the yield were slightly low when the amount of the fluorinating agent to be used was also 1.05 equivalents. In order to achieve the same selectivity and yield as in Examples 1-5 to 1-8, it is necessary to increase the amount of the fluorinating agent to be used to about 1.5 equivalents as shown in Example 1-9-1. A theoretical amount (2 molar times) required for fluorination was set to 1.0 equivalent.

In addition, as shown in Table 4, in Example 1-10 in which an ester having a relative dielectric constant of 8 or less was used as the nonaqueous organic solvent (a), and in Example 1-11 in which propylene carbonate was used as the nonaqueous organic solvent (a), an excellent selectivity and yield can be achieved even when the amount of the fluorinating agent to be used was as relatively small as 1.05 equivalents.

On the other hand, in Example 1-12 in which acetonitrile (relative dielectric constant: about 37) was used as the nonaqueous organic solvent (a), the selectivity and the yield were slightly low when the amount of the fluorinating agent used was also 1.05 equivalents. In order to achieve the same selectivity and yield as in Examples 1-10 and 1-11, it is necessary to increase the amount of the fluorinating agent to be used to about 1.5 equivalents as shown in Example 1-12-1.

The above tendency was also confirmed when the fluorinating agent was changed to a triethylamine monohydrofluoride (Examples 1-3, 1-19, and 1-20) or a tetramethylethylenediamine dihydrofluoride (Examples 1-4, 1-21, and 1-22).

Example 2-1

To a 500 mL glass reactor, 100 mL of EMC and 4.2 g (100 mmol) of lithium chloride (amount of contained water: 4850 ppm by mass) were added, and stirring was started at an internal temperature of 40° C. Thereto, 13.0 g (100 mmol) of the ethyl difluorophosphate obtained in the procedure of Example 1-5 was added over 1 hour. Water contained in lithium chloride and EMC was used as water as one of reaction raw materials. A molar ratio of ethyl difluorophosphate, lithium chloride, and water is 1:1:0.02. At this time, foaming due to the generation of chloroethane was observed. Thereafter, stirring was continued at the internal temperature of 40° C. for 12 hours. The precipitated solid was recovered by filtration, and dried under reduced pressure at 80° C., thereby obtaining lithium difluorophosphate having a purity of 97% at a yield of 98%. Main impurities were lithium monofluorophosphate produced by decomposing lithium difluorophosphate with water. The concentration (concentration in terms of hydrogen fluoride) of acid mixed in lithium difluorophosphate was measured by nonaqueous neutralization titration, and was found to be 2110 ppm by mass. The results are shown in Table 5.

Examples 2-2 to 2-15

Lithium difluorophosphate was obtained in the same procedure as in Example 2-1 except that the type of the raw material before the reaction and the amount of contained water thereof were changed as shown in Table 5. In Example 2-14, a stirring time during the reaction was 48 hours.

Example 2-16

To a 500 mL glass reactor, 100 ml of EMC and 18.6 g (120 mmol) of phosphorus oxychloride were added, and stirring was started at an internal temperature of 40° C. Thereto, 13.0 g (100 mmol) of ethyl difluorophosphate obtained by the procedure in Example 1-5 was added over 2 hours. The reaction solution was purified by distillation to obtain 9.3 g (68.3 mmol) of monochloro difluoro phosphine oxide. Subsequently, to a 500 mL glass reactor, 75 mL of EMC and 9.3 g of monochloro difluoro phosphine oxide were added, and stirring was started at an internal temperature of 5° C. Thereto, 1.2 g (68.3 mmol) of water was added dropwise over 1 hour. After the internal temperature was raised to 25° C., the produced hydrochloric acid was removed under reduced pressure. Thereafter, 2.9 g (70 mmol) of lithium chloride (amount of contained water: 4850 ppm by mass) was added thereto, and the mixture was stirred at the internal temperature of 40° C. for 6 hours. The produced hydrochloric acid and solvent were removed under reduced pressure to obtain a crude product of lithium difluorophosphate. The crude product was recrystallized in dimethoxyethane to obtain 4.9 g (46.1 mmol) of lithium difluorophosphate having a purity of more than 99%. The concentration (concentration in terms of hydrogen fluoride) of acid mixed in lithium difluorophosphate was measured by nonaqueous neutralization titration, and was found to be 100 ppm by mass.

The results are shown in Table 5.

TABLE 5

| | | Raw material before reaction | | | | |
|---|---|---|---|---|---|---|
| | | Difluorophosphate ester represented by general formula (2) | | Lithium salt | | Nonaqueous organic solvent (b) or (c) |
| | Synthesis of lithium difluorophosphate | Synthesis method | R group in general formula (2) | Type | Amount of contained water [ppm by mass] | Type |
| Example 2-1 | Step 2 | | Ethyl | Lithium | 4850 | EMC |
| Example 2-2 | Step 3 | Example 1-5 | | chloride | 2150 | EMC |
| Example 2-3 | Step 3 | | | | 510 | EMC |
| Example 2-4 | Step 3 | Example 1-6 | | | 510 | DMC |
| Example 2-5 | Step 3 | Example 1-3 | | | 510 | EMC |
| Example 2-6 | Step 3 | Example 1-4 | | | 510 | EMC |
| Example 2-7 | Step 3 | Example 1-7 | | | 510 | Ethyl acetate |
| Example 2-8 | Step 3 | Example 1-9 | | | 510 | Acetonitrile |
| Example 2-9 | Step 2 | | | Lithium | 3800 | EMC |
| Example 2-10 | Step 3 | Example 1-5 | | acetate | 1960 | EMC |
| Example 2-11 | Step 3 | | | | 450 | EMC |
| Example 2-12 | Step 3 | Example 1-11 | Methyl | Lithium | 510 | EMC |
| Example 2-13 | Step 3 | Example 1-12 | n-Propyl | chloride | 510 | EMC |

TABLE 5-continued

| | | | | | |
|---|---|---|---|---|---|
| Example 2-14 | Step 3 | Example 1-14 | Phenyl | 510 | EMC |
| Example 2-15 | Step 2 | Example 1-5 | Ethyl | 510 | Acetonitrile |
| Example 2-16 | Step 4 | Example 1-5 | | — | |

| | Raw material before reaction Nonaqueous organic solvent (b) or (c) Amount of contained water [ppm by mass] | Amount of water in total raw materials before reaction in step 2 or 3 [ppm by mass] | Molar ratio of difluorophosphate ester:lithium salt:water in step 2 | Yield [%] | Purity [%] | Concentration of acid [ppm by mass] |
|---|---|---|---|---|---|---|
| Example 2-1 | 110 | 270 | 1:1:0.02 | 98 | 97 | 2110 |
| Example 2-2 | 110 | 170 | 1:1:0.01 | 98 | >99 | 870 |
| Example 2-3 | 110 | 110 | 1:1:0.01 | 98 | >99 | 230 |
| Example 2-4 | 120 | 120 | 1:1:0.01 | 98 | >99 | 200 |
| Example 2-5 | 110 | 110 | 1:1:0.01 | 98 | >99 | 220 |
| Example 2-6 | 110 | 110 | 1:1:0.01 | 98 | >99 | 250 |
| Example 2-7 | 95 | 100 | 1:1:0.01 | 97 | >99 | 210 |
| Example 2-8 | 130 | 130 | 1:1:0.01 | 97 | >99 | 270 |
| Example 2-9 | 110 | 300 | 1:1:0.02 | 95 | 97 | 2350 |
| Example 2-10 | 110 | 200 | 1:1:0.01 | 96 | >99 | 920 |
| Example 2-11 | 110 | 120 | 1:1:0.01 | 95 | >99 | 300 |
| Example 2-12 | 110 | 110 | 1:1:0.01 | 98 | >99 | 230 |
| Example 2-13 | 110 | 110 | 1:1:0.01 | 98 | >99 | 260 |
| Example 2-14 | 110 | 110 | 1:1:0.01 | 97 | 98 | 330 |
| Example 2-15 | 280 | 250 | 1:1:0.01 | 95 | 96 | 3130 |
| Example 2-16 | | — | | 46 | >99 | 100 |

INDUSTRIAL APPLICABILITY

According to the present disclosure, it is possible to provide a novel method for producing lithium difluorophosphate, a method for producing a nonaqueous electrolytic solution, and a method for producing a nonaqueous secondary battery, in which the amount of raw materials used for the reaction is small and the efficiency is excellent.

In addition, according to the present disclosure, it is possible to provide a method for producing a difluorophosphate ester that can stably achieve a high fluorination selectivity and a high yield, a method for producing lithium difluorophosphate derived from the difluorophosphate ester, a method for producing a nonaqueous electrolytic solution using the lithium difluorophosphate, and a method for producing a nonaqueous secondary battery.

Further, according to the present disclosure, it is possible to provide lithium difluorophosphate that generates less heat when dissolved in a nonaqueous electrolytic solution as an additive.

Although the present disclosure is described in detail with reference to specific embodiments, it will be apparent to those skilled in the art that various changes and modifications may be made without departing from the spirit and scope of the disclosure.

The present application is based on Japanese Patent Application (JP-A-2019-144873) filed on Aug. 6, 2019 and Japanese Patent Application (JP-A-2019-144874) filed on Aug. 6, 2019, contents of which are incorporated herein by reference.

The invention claimed is:

1. A method for producing lithium difluorophosphate, comprising:

allowing a difluorophosphate ester represented by the following general formula (1A) to react with a lithium salt compound in a nonaqueous organic solvent, wherein water is not used as a raw material in the reaction, (1A)

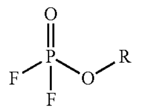

in which R represents an alkyl group having 1 to 15 carbon atoms or an aryl group having 6 to 15 carbon atoms, and any hydrogen atom of the alkyl group and the aryl group may be substituted with a halogen atom.

2. The method for producing lithium difluorophosphate according to claim 1, wherein an amount of water contained in a total amount of the difluorophosphate ester represented by the general formula (1A), the lithium salt compound, and the nonaqueous organic solvent before the reaction is 200 ppm by mass or less.

3. The method for producing lithium difluorophosphate according to claim 1, wherein the lithium salt compound is at least one selected from the group consisting of lithium chloride, lithium bromide, lithium fluoride, lithium carbonate, lithium acetate, and lithium propionate.

4. The method for producing lithium difluorophosphate according to claim 1, wherein the nonaqueous organic solvent is at least one selected from the group consisting of a carbonate ester, a chain ester, an ether, and a ketone.

5. The method for producing lithium difluorophosphate according to claim 1, wherein the reaction is performed under protection of an inert gas.

6. The method for producing a lithium difluorophosphate according to claim 1, wherein the difluorophosphate ester represented by the general formula (1A) is produced by a method for producing a difluorophosphate ester including a step 1 of allowing a dihalophosphate ester represented by the following general formula (1) to react with a fluorinating agent having a concentration of contained hydrogen fluoride of 15 mol % or less in a nonaqueous organic solvent (a),

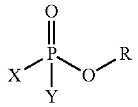

(1)

wherein X represents a fluorine atom, a chlorine atom, a bromine atom, or an iodine atom, and Y represents a chlorine atom, a bromine atom, or an iodine atom, and R represents an alkyl group having 1 to 15 carbon atoms or an aryl group having 6 to 15 carbon atoms, and any hydrogen atom of the alkyl group and the aryl group may be substituted with a halogen atom.

7. The method for producing a lithium difluorophosphate according to claim 6, wherein the nonaqueous organic solvent (a) is at least one selected from the group consisting of a carbonate ester, a chain ester, and a ketone.

8. The method for producing lithium difluorophosphate according to claim 6, wherein the fluorinating agent is at least one selected from a hydrofluoride of organic amine and inorganic fluoride.

9. The method for producing lithium difluorophosphate according to claim 8, wherein the hydrofluoride of organic amine is at least one selected from the group consisting of a triethylamine monohydrofluoride, a tetramethylethylenediamine dihydrofluoride, and a pyridine monohydrofluoride, and the inorganic fluoride is at least one selected from the group consisting of ammonium fluoride, sodium fluoride, potassium fluoride, cesium fluoride, and zinc fluoride.

10. The method for producing lithium difluorophosphate according to claim 6, wherein the fluorinating agent is at least one selected from sodium fluoride, ammonium fluoride, a triethylamine monohydrofluoride, and a tetramethylethylenediamine dihydrofluoride, and the nonaqueous organic solvent (a) is at least one selected from an ester having a relative dielectric constant of 8 or less at 25° C., an ether having a relative dielectric constant of 8 or less at 25° C., and propylene carbonate.

11. The method for producing lithium difluorophosphate according to claim 6, wherein no catalyst is used in the reaction in the step 1.

12. The method for producing a lithium difluorophosphate according to claim 1, further comprising recovering from the reaction mixture a precipitated solid containing lithium difluorophosphate.

* * * * *